US007221760B2

(12) United States Patent
Javidi et al.

(10) Patent No.: US 7,221,760 B2
(45) Date of Patent: May 22, 2007

(54) INFORMATION SECURITY USING DIGITAL HOLOGRAPHY

(75) Inventors: Bahram Javidi, Storrs, CT (US); Enrique Tajahuerce, Castellon (ES)

(73) Assignee: The University of Connecticut, Storrs, CT (US)

(*) Notice: Subject to any disclaimer, the term of this patent is extended or adjusted under 35 U.S.C. 154(b) by 717 days.

(21) Appl. No.: 09/822,775

(22) Filed: Mar. 30, 2001

(65) Prior Publication Data
US 2006/0078113 A1    Apr. 13, 2006

(51) Int. Cl.
G03H 1/00       (2006.01)
G09C 5/00       (2006.01)
H04L 9/28       (2006.01)

(52) U.S. Cl. .................. 380/210; 380/54; 713/176; 359/2

(58) Field of Classification Search ................ 380/210, 380/54; 713/176; 359/2
See application file for complete search history.

(56) References Cited

U.S. PATENT DOCUMENTS

| | | | | |
|---|---|---|---|---|
| 4,776,013 A | * | 10/1988 | Kafri et al. | 380/54 |
| 5,325,324 A | * | 6/1994 | Rentzepis et al. | 365/127 |
| 5,719,691 A | | 2/1998 | Curtis et al. | 359/11 |
| 5,740,276 A | * | 4/1998 | Tomko et al. | 382/210 |
| 5,793,871 A | * | 8/1998 | Jackson | 380/54 |
| 5,903,648 A | | 5/1999 | Javidi | 380/10 |
| 5,940,514 A | * | 8/1999 | Heanue et al. | 713/193 |
| 5,943,145 A | | 8/1999 | Curtis et al. | 359/22 |
| 5,974,178 A | * | 10/1999 | Kitayoshi | 382/210 |
| 6,002,773 A | | 12/1999 | Javidi | 380/54 |

(Continued)

FOREIGN PATENT DOCUMENTS

WO    WO 9705594 A1 *  2/1997

OTHER PUBLICATIONS

Ladino, Jeffrey, "Data Compression Algorithms", 1996, <http://www.ccs.neu.edu/groups/honors-program/freshsem/19951996/jnl22/jeff.html>, pp. 1-6.*

(Continued)

*Primary Examiner*—Emmanuel L. Moise
*Assistant Examiner*—Michael Pyzocha
(74) *Attorney, Agent, or Firm*—Cantor Colburn LLP

(57) ABSTRACT

A method and system for encrypting multi-dimensional information utilizing digital holography is presented. A phase-shifting interferometer records the phase and amplitude information generated by a three-dimensional object at a plane located in the Fresnel diffraction region with an intensity-recording device. Encryption is performed by utilizing the Fresnel diffraction pattern of a random phase mask. Images of different perspectives of the three-dimensional object focused at different planes can be generated digital or optically with the proper key after decryption.

After decryption, images of the object, focused at different planes, can be generated digitally or optically. The method allows for the reconstruction of the object with different perspectives from a single encrypted image. The method does not require sending the key exclusively through a digital communication channel. Instead, a copy of the random phase key itself can be sent to the authorized user.

A method of forming an image of an object is disclosed. The method comprises forming an original hologram of the object; compressing the original hologram of the object to form a compressed hologram; decompressing the compressed hologram of the object to form a decompressed hologram; and reconstructing the object from the decompressed hologram to form a multi-dimensional image of the object.

92 Claims, 19 Drawing Sheets

U.S. PATENT DOCUMENTS 6,248,487 B1 * 6/2001 Cohn et al. .................. 430/30
6,907,124 B1 * 6/2005 Gluckstad .................. 380/205

OTHER PUBLICATIONS

Tan et al, "Secure optical storage that uses fully phase encryption," Applied Optics, Dec. 10, 2000, pp. 6689-6694.*

Tajahuerce et al, "Encrypting three-dimensional information with digital holography," Applied Optics Dec. 10, 2000, pp. 6595-6601.*

John B. Develis, George 0. Reynolds, Handbook on Optical Holography, "Fresnel Holography", 1979 by Acedemic Press, Chapter 4.1 (pp. 139-155).

Brian J. Thompson, Handbook on Optical Holography, "Fraunhofer Holograms", 1979 by Academic Press, Chapter 4.2 (pp. 157-163).

Henri H. Arsenault, Gilbert April, Handbook on Optical Holography"Fourier Holography",1979 by Academic Press, Chapter 4.3, (pp. 165-180).

David Casasent, Handbook on Optical Holography, "Pattern and Recognition", 1979 by Academic Press, Chapter 10.5, (pp. 503-536).

O. Matoba, B. Javidi, Optics Letters, "Encrypted Optical Memory Sysrem Using Three-Dimensional Keys in the Fresnel Domain", vol. 24, No. 11, Jun. 1999, (pp. 762-764).

E. Tajahuerce, O. Matoba, S.C. Verrall, B. Javidi, Applied Optics, "Optoelectronic Information Encryption With Phase-Shifting Interferometry", vol. 39, No. 14, May 2000, (pp. 2313-2320).

J. Schwider, Progress in Optics, "Advanced Evaluation Techniques in Interferometry"vol. XXVIII, North Holland, Amsterdam, 1990, (pp. 273-359).

C. Denz, K.O. Muller, F. Visinka, T. Tschudi, Proceedings of SPIE, "Digital Volume Holographic Data Storage Using Phase-Coded Multiplexing", vol. 3802, No. 20-22, Jul. 1999, (pp. 142-147).

Y. Takaki, H. Kawai, H. Ohzu, Applied Optics, "Hybrid Holographic Microscopy Free of Conjugate and Zero-Order Images", vol. 38, No. 23, Aug. 1999, (pp. 4990-4996).

J.F. Heanue, M.C. Bashaw, L. Hesselink, Applied Optics, "Encypted Holographic Data Storage BAsed on Orthogonal-Phase-Code Multiplexing", vol. 34 No. 26, Sep. 1995, (pp. 6012-6015).

b. Javidi, T. Nomura, Optics Letters, "Securing Information by Use of Digital Holography", vol. 25, No. 1 , Jan. 2000, (pp. 28-30).

I. Yamaguchi, T. Zhang, Optics Letters, "Phase-Shifting Digital Holography", vol. 22, No. 16, Aug. 1997, (pp. 1268-1270).

N. Yoshikawa, M. Itoh, T. Yatagai, Optics Letters, "Binary Computer-Generated Holograms for Security Applications From a Synthetic Double-Exposure Method by Electron-Beam Lithography", vol. 233, No. 16, Sep. 1998, (pp. 1483-1485).

P. Refregier, B. Javidi, Opticis Letters, "Optical Image Encryption Based on Input Plane and Fournier Plane Random Encoding", vol. 20, No. 7, Apr. 1995, (pp. 767-769).

C. Denz, G. Pauliat, G. Roosen, Optics Communications, "Volume Hologram Multiplexing Using a Deterministic Phase Encoding Method", vol. 85, No. 2, Sep. 3, 1991, (pp. 171-176).

J.E. Ford, Y. Fainman, S.E. Lee, Optics Letters, "Array Interconnection by Phase-Coded Optical Correlation", vol. 15, No. 19, Oct. 1990, (pp. 1088-1090).

J.H. Bruning, D.R. Herriott, J.E. Gallagher, D.P. Rosenfeld, A.D. White, D.J. Brangaccio, Applied Optics, "Digital Wavefront Measuring Interferometer for Testing Optical Surfaces and Lenses" vol. 13, No. 11, Nov. 1974, (pp. 2693-2703).

C. C. Sun, W.C. Du, B. Wang, Y. Ouyang, Optics Communications, "Diffraction Selectivity of Holograms With Random Phase Encoding", vol. 175, Feb. 2000, (pp. 67-74).

H. Lee, S. K. Jin, Applied Physics Letters, "Experimental Study of Volume Holographic Interconnects Using Random Patterns", vol. 62, No. 18, May 1993, (pp. 2191-2193).

J.W. Cooley, J.W. Tukey, Mathematics of Computation, "An Algorithm for the Machine Calculation of Complex Fourier Series", vol. 19, Apr. 1965, (pp. 297-301).

H.Y.S. Li, Y. Qiao, D. Psaltis, Applied Optics,"Optical Network for Real-Time Face Recognition", vol. 32, No. 26, Sep. 1993, (pp. 5026-5035).

B. Javidi, J.L. Horner, Optical Engineering, "Optical Pattern Recognition for Validation and Security Verification", vol. 33, No. 6, Jun. 1994, (pp. 1752-1756).

E. Cuche, F. Bevilacqua, C. Depeursinge, Optics Letters, "Digital Holography for Quantitive Phase-Contrast Imaging", vol. 24, No. 5, Mar. 1999 (pp. 291-293).

C.L. Wilson, C.I. Watson, E.G. Paek, SPIE Proceedings, "Combined Optical and Neural Network Fingerprint Matching", vol. 3073, No. 22-23, Apr. 1997, (pp. 373-382).

U. Schnars, W. Juptner, Applied Optics, "Direct Recording of Holograms by CCD Target and Numerical Reconstruction", vol. 33, No. 2, Jan. 1994, (pp. 179-181).

J.W. Goodman, "Introduction to Fourier Optics", Chapter 9, McGraw-Hill New York, 1996 (pp. 295-341, 351-363).

* cited by examiner

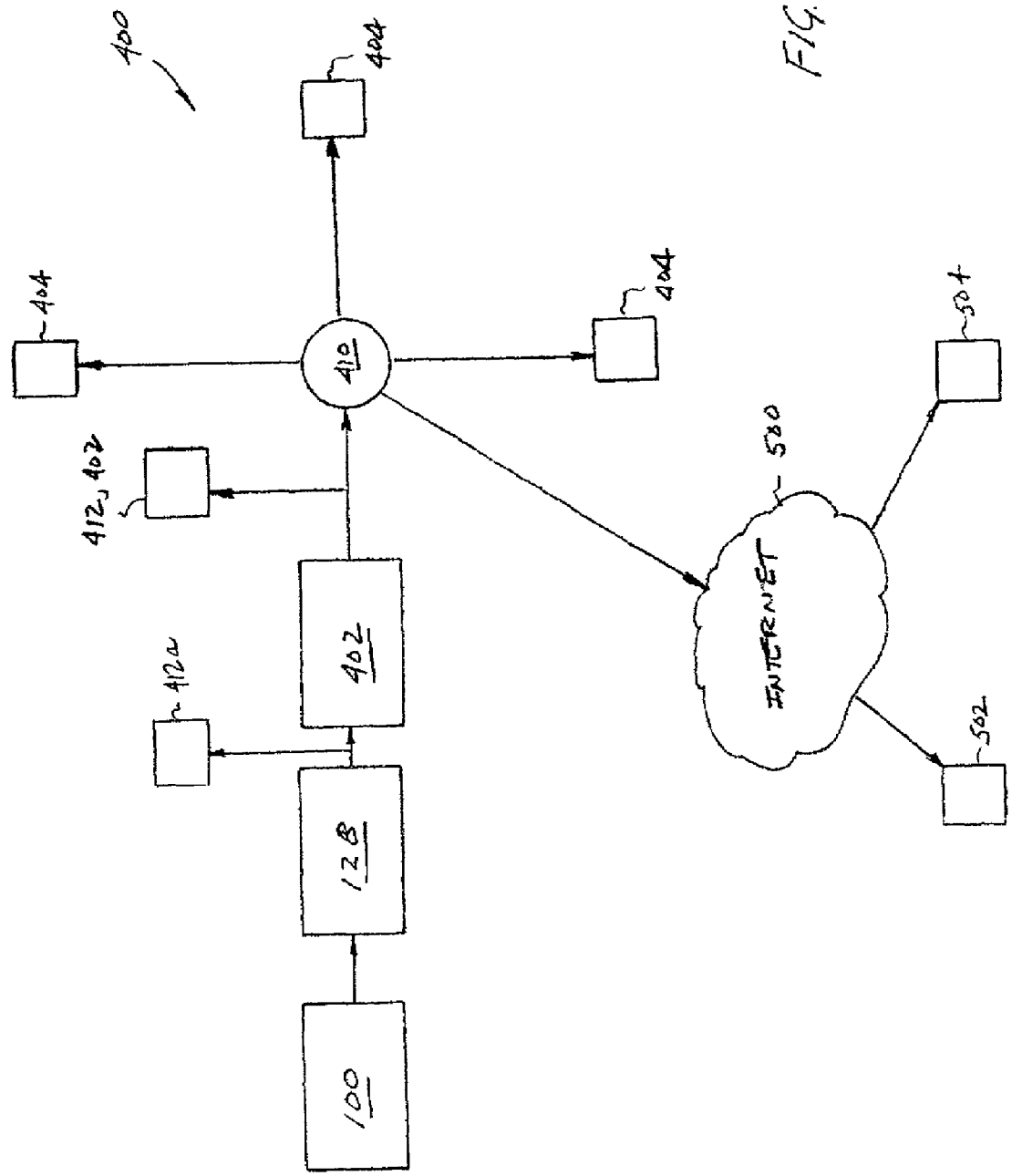

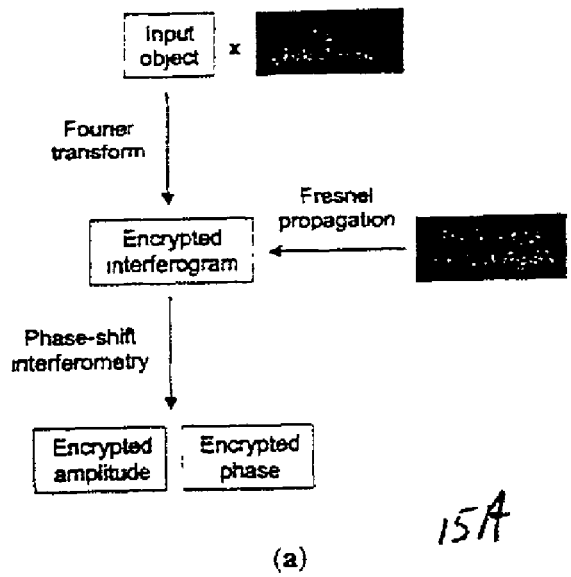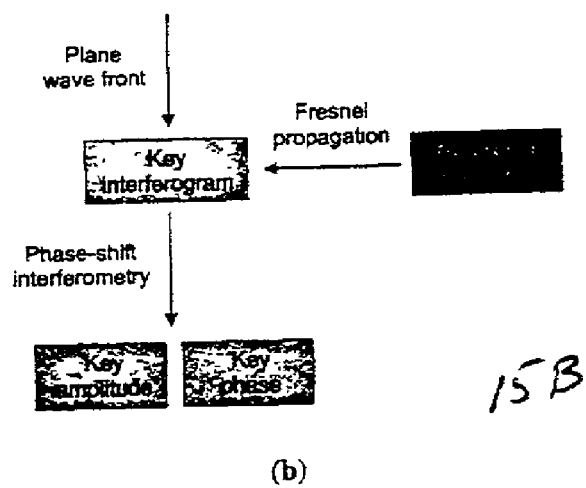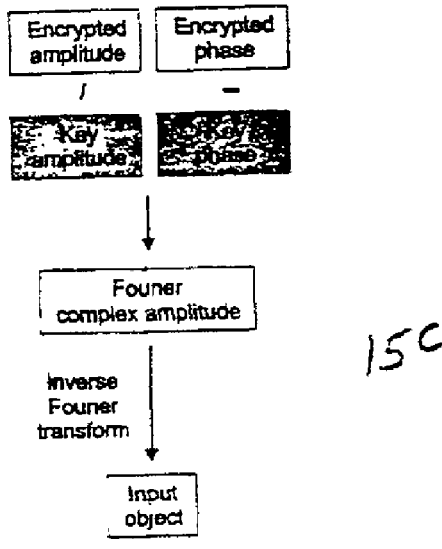
FIG. 15

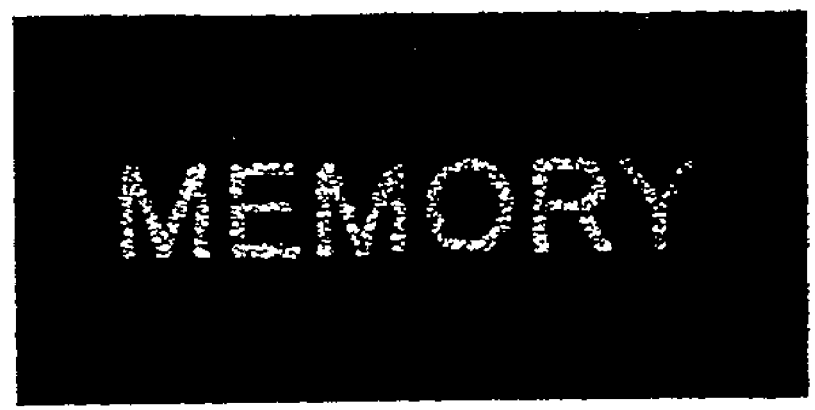
FIG. 17
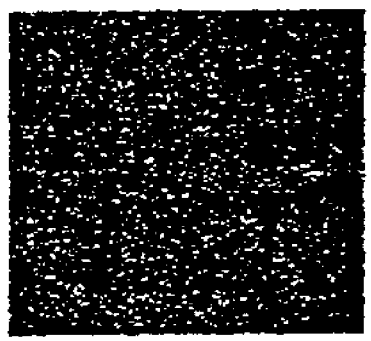
(a)
(b)
(c)
FIG. 18

INFORMATION SECURITY USING DIGITAL HOLOGRAPHY

TECHNICAL FIELD OF THE INVENTION

This invention relates to a method and system for encrypting and decrypting multi-dimensional information, objects or data with digital holography.

BACKGROUND OF THE INVENTION

The application of optical processing systems to security, verification, and encryption of information has been explored previously (H.-Y. Li, Y. Qiao, and D. Psaltis, "Optical Network For Real-time Face Recognition," *Appl. Opt.* 32, 5026–5035 (1993); B. Javidi and J. L. Horner, "Optical Pattern Recognition For Validation and Security Verification," *Opt. Eng.* 33, 1752–1756 (1994); Ph. Refrégier and B. Javidi, "Optical Image Encryption Based on Input Plane and Fourier Plane Random Encoding," *Opt. Lett.* 20, 767–769 (1995); C. L. Wilson, C. I. Watson, and E. G. Paek, "Combined Optical and Neural Network Fingerprint Matching," *Proc. SPIE* 3073, 373–382 (1997); N. Yoshikawa, M. Itoh, and T. Yatagai, "Binary Computer-generated Holograms for Security Applications From A Synthetic Double-exposure Method by Electron-beam Lithography," *Opt. Lett.* 23, 1483–1485 (1998) and O. Matoba and B. Javidi, "Encrypted Optical Memory System Using Three-dimensional Keys in the Fresnel Domain," *Opt. Lett.* 24, 762–764 (1999); which are incorporated herein by reference).

In one approach, the information to be secured or verified is encoded as a two-dimensional image using amplitude, phase, polarization or wavelength modulation of light and optically processed. In order to encrypt the information, random phase-codes can be used to modify the Fraunhofer or Fresnel diffraction patterns of the input image (B. Javidi and J. L. Horner, "Optical Pattern Recognition For Validation and Security Verification," *Opt. Eng.* 33, 1752–1756 (1994); Ph. Refrégier and B. Javidi, "Optical Image Encryption Based on Input Plane and Fourier Plane Random Encoding," *Opt. Lett.* 20, 767–769 (1995) and O. Matoba and B. Javidi, "Encrypted Optical Memory System Using Three-dimensional Keys in the Fresnel Domain," *Opt. Lett.* 24, 762–764 (1999)) as in methods for securing or multiplexing holographic memories (J. E. Ford, Y. Fainman, and S. H. Lee, "Array Interconnection By Phase-coded Optical Correlation," *Opt. Lett.* 15, 1088–1 090 (1990); C. Denz, G. Pauliat, G. Roosen, and T. Tschudi, "Volume Hologram Multiplexing Using A Deterministic Phase Encoding Method," *Opt. Commun.* 85, 171–176 (1991); H. Lee and S. K. Jin, "Experimental Study of Volume Holographic Interconnects Using Random Patterns," *Appl. Phys. Lett.* 62, 2191–2193 (1993); J. F. Heanue, M. C. Bashaw, and L. Hesselink, "Encrypted Holographic Data Storage Based on Orthogonal-phase-code Multiplexing," *Appl. Opt.* 34, 6012–6015 (1995); C. Denz, K. O. Mueller, F. Visinka, and T. I. Tschudi, "Digital Volume Holographic Data Storage Using Phase-coded Multiplexing," *Proc. SPIE.* 3802,142–147 (1999) and C. C. Sun, W. C. Su, B. Wang, and Y. Ouyang, "Diffraction Selectivity of Holograms With Random Phase Encoding," *Opt. Commun.* 175, 67–74 (2000) which are incorporated herein by reference).

In general, the encrypted image contains both amplitude and phase and thus holographic recording may also be required (J. W. Goodman, *Introduction to Fourier Optics*, McGraw-Hill, New York, 1996 which is incorporated herein by reference). This necessity makes it difficult to transmit the encrypted information over conventional communication channels.

Several digital holography methods have been applied to solve the previous problem by recording fully complex information with electronic cameras (U. Schnars and W. P. O. Juptner, "Direct Recording of Holograms By A CCD Target and Numerical Reconstruction," *Appl. Opt.* 33, 179–18 1 (1994); Y. Takaki, H. Kawai, and H. Ohzu, "Hybrid Holographic Microscopy Free of Conjugate and Zero-order Images," *Appl. Opt.* 38, 4990–4996 (1999) and E. Cuche, F. Bevilacqua, and C. Depeursinge, "Digital Holography For Quantitative Phase-contrast Imaging," *Opt. Lett.* 24, 291–293 (1999) which are incorporated herein by reference). Among them, digital phase-shifting interferometry stands out as a versatile and efficient technique (J. H. Bruning, D. R. Herriott, J. E. Gallagher, D. P. Rosenfeld, A. D. White, and D. J. Brangaccio, "Digital Wavefront Measuring Interferometer For Testing Optical Surfaces And Lenses," *Appl. Opt.* 13, 2693–2703 (1974); J. Schwider, "Advanced Evaluation Techniques In Interferometry," in: *Progress in Optics*, Vol. XXVIII, ed. E. Wolf, pp. 271–359 (North-Holland, Amsterdam, 1990) and I. Yamaguchi and T. Zhang, "Phase-shifting Digital Holography," *Opt. Lett.* 22, 1268–1270 (1997) which are incorporated herein by reference).

A first attempt to electronically record the holographic information associated with a two-dimensional encrypted image has already been reported by using off-axis digital holography (B. Javidi and T. Nomura, "Securing Information By Means Of Digital Holography," *Opt. Lett.* 25, 28–30 (2000) which is incorporated herein by reference) and inline digital holography (E. Tajahuerce, O. Matoba, S. C. Verrall, and B. Javidi, "Optoelectronic Information Encryption With Phase-shifting Interferometry", *Appl. Opt.* 39, 23 13–2320 (2000) which is incorporated herein by reference). In this way, advantages of optical encryption such as speed, large number of degrees of freedom and high security, are combined with the usefulness of electronic information transmission.

Optical encryption and security are recent applications of optical information processing. (F, Goudail, F, Bollaro, B. Javidi, and Ph. Refregier, "Influence of A Perturbation In A Double Phase-encoding System," *J. Opt. Soc. Am. A* 15, 2629–2638(1998); H. Y. Li, Qiao and D. Psaltis, "Optical Network For Real-time Face Recognition," *Appl. Opt.* 32, 5026–5035 (1993); Ph. LaLanne, H, Richard, J. C. Rodier, P. Chavel, J. Taboury, K. Madani, P. Garda and F. Devos, "2D Generation of Random Numbers By Multimode Fiber Speckle for Silicon Arrays of Processing Elements," *Opt. Commun.* 76, 387–394 (1990) and J. L. Horner and B. Javidi, eds., *Optical Engineering Special Issue on Optical Security* (SPIE, Belingham, Wash., 1999), Vol. 38, which are incorporated herein by reference). Optical systems present a good potential for these tasks because, they provide a large degree of freedom to secure data. Several different techniques exist to secure and store data by phase encoding. (T. F. Krile, M. O. Hagler, W. D. Redus and J. F. Walkup, "Multiplex Holography With Chirp-modulated Binary Phase-coded Reference-beam Masks," *Appl. Opt.* 18, 52–56 (1979) and Y. H. Kang, K. H. Kim and B. Lee "Volume Hologram Scheme Using Optical Fiber for Spatial Multiplexing," *Opt. Lett.* 22, 739–741 (1997) which are incorporated herein by reference) In each case the encrypted data are fully complex and thus may be recorded and stored holographically. (H. J. Caulfield, ed., *Handbook of Optical Holography* (Academic, London, 1979) which is incorporated herein by reference). A high quality reconstruction can be obtained by use of a high density analog recording medium. However, information recorded in this way is difficult to transmit over digital communication lines. If not digitized, or converted in some way, this information must be reconstructed optically.

One way in which fully complex information may be stored or communicated digitally is to record it with digital holography. (L. Onural and P. D. Scott, "Digital Decoding of In-line Holograms," *Opt. Eng.* 26, 1124–1132 (1987); U. Schnarrs, "Direct Phase Determination In Hologram Interferometry With Use of Digitally Recorded Holograms," *J. Opt. Soc. Am.* A 11, 2011–2015 (1994); G. Pedrini, Y. L. Zou and H. J. Tiziani, "Digital Double-pulsed Holographic Interferometry for Vibration Analysis," *J. Mod. Opt.* 40, 367–374 (1995); J. C. Marron and K. S. Schroeder, "Three-dimensional Lensless Imaging Using Laser Frequency Diversity," *Appl. Opt.* 31, 255–262 (1992); U. Schnarrs, T. M. Kreis and W. P. O. Juptner, "Digital Recording and Numerical Reconstruction of Holograms: Reduction of the Spatial Frequency Spectrum," *Opt. Eng.* 35, 977–982 (1996) and E. Cuche, F. Bevilaqua and C. Depeursinge, "Digital Holography for Quantitative Phase-contrast Imaging," *Opt. Lett.* 24, 291–293 (1993) which are incorporated herein by reference). With this method holograms are captured by an electronic camera and reconstructed by use of a digital computer that approximates a diffraction integral. These digital holograms may also be reconstructed optically, but digital reconstruction allows the focus to be adjusted electronically.

A method for using the CCD capabilities more efficiently is by digital phase-shifting interferometry to record the fully complex information. (K. Creath, "Phase-measurement Interferometry Techniques," in *Progress In Optics*, E. Wolf, ed. (North-Holland, Amsterdam, 1990), Vol. XXVI, pp. 349–393 and T. Zhang and I. Yamaguchi, "Three-dimensional Microscopy With Phase-shifting Digital Holography," *Opt. Lett.* 23, 1221–1223 (1998) which are incorporated herein by reference). This phase-measurement technique is more precise than that of digitally recording an off-axis hologram. Generally, the system errors decrease with an increase in the number of phase-shift steps used to infer the fully complex information. However, it should be noted that, with currently available technology, the largest sources of system errors are the limited resolution and dynamic range of commercially available CCD arrays.

SUMMARY OF THE INVENTION

A method and system for encrypting and decrypting multi-dimensional information or data by using digital holography is disclosed. A phase-shifting interferometer records the phase and amplitude information generated by an object at a plane located in the Fourier or Fresnel diffraction region in an intensity-recording device. This information is encrypted with the Fourier or Fresnel diffraction pattern generated by a random phase mask and stored electronically. To perform decryption, a key is also electronically recorded by phase-shifting interferometry. The encrypted hologram can be transmitted electronically to remote locations but can only be decoded with the proper keys.

After decryption, images of the object, focused at different planes, can be generated digitally or optically. The method allows for the reconstruction of the object with different perspectives from a single encrypted image. The method does not require sending the key exclusively through a digital communication channel. Instead, a copy of the random phase key itself can be sent to the authorized user.

A method of forming a remote image of an object is disclosed. The method comprises forming a hologram of the object; compressing the hologram of the object; transmitting the compressed hologram of the object to remote locations over a distributed computer network; decompressing the compressed hologram of the object; and reconstructing the object from the decompressed hologram of the object.

EXPLANATION OF THE DRAWINGS

FIG. 9 is a schematic representation of a distributed computer network connected to the phase-shifting holographic system of FIG. 1.

FIG. 15A–15C is a schematic representation of a method of encryption, obtaining a key and decryption of an object;

FIG. 17 is a representation of information to be encrypted by Fourier transformation of the input obtained by digital phase-shifting interferometry of FIG. 14 without a reference phase mask;

FIG. 18A–18C is a representation of encrypted images of the input of FIG. 17 wherein FIG. 18A is a gray level representation of the phase distribution obtained by phase shifting interferometry, FIG. 18B is the amplitude distribution and 18C shows the reconstruction of the input object from the complex amplitude distribution associated with FIGS. 18A and 18C;

FIG. 19A–19C is a representation of the key and decryption of FIG. 17 wherein FIG. 19A is a gray level representation of the phase distribution of the key at the output plane obtained by phase-shifting interferometry, 19B is the amplitude distribution and 19C shows the reconstruction of the input object when the phase and the amplitude distribution in FIG. 18A–18C are corrected with the key;

FIG. 21A–21C is a representation of encrypted images of the information in FIG. 20 obtained by phase-shifting interferometry with the system of FIG. 16 wherein FIG. 21A is a gray level representation of the phase distribution, FIG. 21B is the amplitude distribution and FIG. 21C shows an attempt to reconstruct the input object from the complex amplitude distribution associated with FIGS. 21A and 21B; and FIG. 22A–22C is a representation of the key and decryption of the information in FIG. 20 wherein FIG. 22A is a gray-level representation of the phase distribution of the key at the output plane, FIG. 22B is the amplitude distribution of the key and FIG. 22C shows the successful reconstruction of the input object when the phase and amplitude distribution in FIG. 21A–22c are corrected with the previous key.

DETAILED DESCRIPTION OF THE INVENTION

Figure 1:
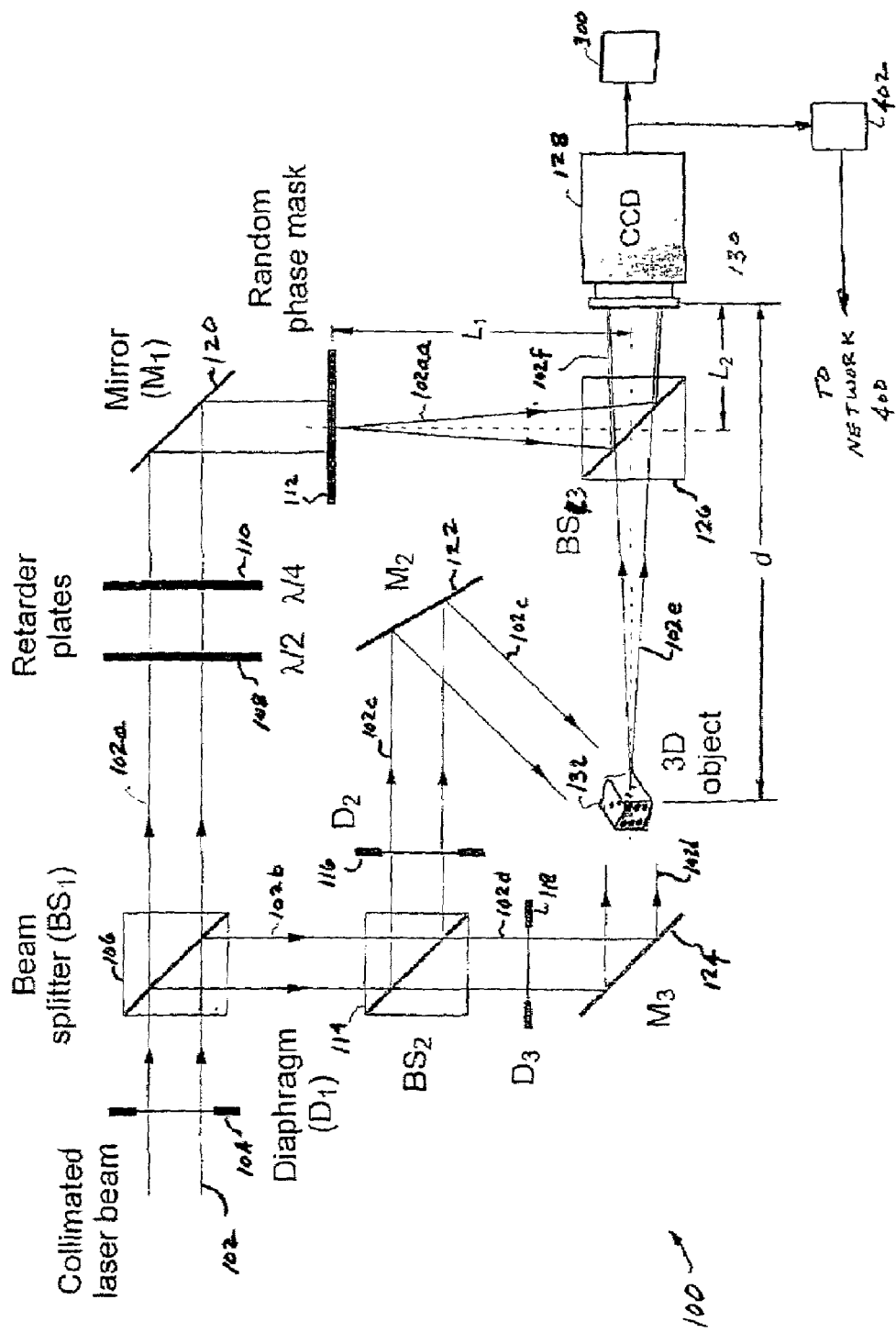
FIG. 1 is a first schematic diagram of a phase-shifting holographic system for encrypting multi-dimensional information.

A system for encrypting multi-dimensional information or data is shown generally at 100 in FIG. 1. The system 100 is based on an interferometer, such as a Mach-Zehnder interferometer. A first beam splitter 106 divides polarized and collimated light 102 originating from a laser, such as an Argon laser, a Helium-Neon laser an infrared laser or similar laser (not shown) embracing a range of wavelengths, into a reference beam (or reference set of data) 102a, 102aa and an object beam 102b, 102c 102e.

With a first diaphragm 116 open, and a second diaphragm 118 closed, the object beam 102b, 102c illuminates a moving or still object, such as an opaque three-dimensional object 132 (to be encrypted), after reflecting in a second beam splitter 114 and reflection at mirror 122. The object 132 may also be, for example, a two-dimensional or three-dimensional phase object, a color object, an original set of data comprising an optical image, a digitized image, a computer generated image, a one dimensional set of data or multi-dimensional set of data, an electrical signal or an optical signal. The object 132 is shown as a three-dimensional object by way of exemplification.

Assuming that the incident light 102c is diffracted from the object 132 only once, the object 132 can be described at an output plane 130 as a three-dimensional continuum distribution of point sources with relative amplitude $U_O(x,y,z)$, were x and y are transverse coordinates and z is the paraxial distance from the object 132 to the output plane 130. In this manner, the complex amplitude distribution, $U_H(x,y)$, at the output plane 130, can be evaluated from the following three-dimensional superposition integral:

$$U_H(x, y) = A_H(x, y)\exp[i\phi_H(x, y)] \quad (1)$$

$$= \frac{1}{i\lambda}\int\int\int_{-\infty}^{\infty}U_o(x', y'; z) \times \frac{1}{z}\exp\left[i\frac{2\pi}{\lambda}z\right]$$

$$\exp\left\{i\frac{\pi}{\lambda z}[(x-x')^2 + (y-y')^2]\right\}dx'\,dy'\,dz$$

where $\lambda$ is the wavelength of the incident light. In Eq. (1), $A_H(x,y)$ and $\phi_H(x,y)$ are the amplitude and phase, respectively, of the complex amplitude distribution, $U_H(x,y)$, at the output plane 130 generated by the object beam 102e diffracted from the object 132. In this approximation, neglecting secondary diffraction, the object 132 can be considered also as a continuum of two-dimensional images at different distances z to the output plane 130.

The reference beam 102a travels through two phase retarders 108, 110 and is diffracted by a random phase mask 112. The light so diffracted 102aa is reflected by a third beam splitter 126 and interferes, at 102f, with the light 102e diffracted by the three-dimensional object 132. The interference pattern of the object beam 102e and the diffracted reference beam 102aa is recorded as a hologram in the output plane 130 of a detector 128, such as a CCD detector or an optically or electrically addressable spatial light modulator. The phase retarders 108, 110 are quarterwave ($\lambda/4$), and halfwave ($\lambda/2$) plates. As seen in FIG. 8 the phase retarders 108, 110 allow for the modulation or shifting of the phase, $\phi$, of the reference beam 102a with respect to the object beam 102b. In this manner, phase shifts, $\Delta\phi_p$, of $\Delta\phi_1=0$, $\Delta\phi_2=-\pi/2$, $\Delta\phi_3=-\pi$, and $\Delta\phi_4=-3\pi/2$ are introduced into the reference beam 102a with respect to the object beam 102b by the relative positioning of the fast and slow axes of the phase retarders 108, 110 with the polarization of the incident light 102a. The aforesaid phase shifts, $\Delta\phi_p$, may also be introduced into the reference beam 102a with respect to the object beam 102b by other methods or apparatus, such as the use of a liquid crystal chip in place of the phase retarders 108, 110 or by the movement of mirror 120. The phase mask 112, with a random phase distribution of $\phi(x,y)$, and located at a distance $L=L_1+L_2$ from the output plane 130 (FIG. 1), generates a complex field, $U_R(x,y;\Delta\phi_p)$, for each of the aforesaid phase shifts, $\Delta\phi_p$, given by the following Fresnel integral:

$$U_R(x, y; \Delta\varphi_p) = \exp[i\Delta\varphi_p]\exp\left[i\frac{\pi}{\lambda L}(x^2 + y^2)\right] \times \quad (2)$$

$$\int_{-\infty}^{\infty}\exp[i\phi(x', y')]\exp\left[i\frac{\pi}{\lambda L}(x'^2 + y'^2)\right]$$

$$\exp\left[-i\frac{2\pi}{\lambda L}(xx' + yy')\right]dx'\,dy'$$

In Eq. 2 constant factors other than $\Delta\phi_p$ have been neglected. Equation (2) can be written in the form of a convolution as:

$$U_R(x, y; \Delta\varphi_p) = A_R(x, y)\exp[i(\varphi_R(x, y) + \Delta\varphi_p)] \quad (3)$$

$$= \exp(i\Delta\varphi_p)\exp[i\Phi(x, y)] \otimes \exp\left[i\frac{\pi}{\lambda L}(x^2 + y^2)\right]$$

(J. W. Goodman, *Introduction to Fourier Optics*, McGraw-Hill, New York, (1996)).

In Eq. 3, $A_R(x,y)$ and $\phi_R(x, y)$ are the amplitude and phase, respectively, of the complex amplitude distribution, $U_R(x, y;\Delta\phi_p)$ at the output plane 130 generated by the reference beam 102a when both fast axes of the phase retarders 108, 110 are aligned with the direction of polarization, i.e., when $\Delta\phi_p=0$. Since $\Phi(x,y)$ is a random phase distribution, from Eq. (3) it may be concluded that $A_R(x,y)$ and $\phi_R(x,y)$ are random, noise-like functions.

The interference pattern, $I_p(x,y)$, of the combination of $U_H(x,y)$ and $U_R(x,y;\Delta\phi_p)$ is recorded digitally, or on film, as a hologram at the output plane 130. Such digital recording may be in the form, for example, of tangible media, such as floppy diskettes, CD-ROMs, hard drives, electrically or optically addressable spatial light modulators, charge coupled devices or any other computer-readable storage medium addressable across a distributed environment such as a computer or communications network system. $I_p(x,y)$ is given by the coherent superposition of Eqs. (1) and (3), i.e.

$$I_p(x, y) = [A_H(x, y)]^2 + [A_R(x, y)]^2 + \quad (4)$$
$$2A_H(x, y)A_R(x, y)\cos[\phi_H(x, y) - \varphi_R(x, y) - \Delta\varphi_p]$$

Recording four interference patterns, $I_p(x,y)$, (or holograms) with the phase of the reference beam 102a shifted by $\Delta\phi_p$, it is possible to obtain the encrypted phase and encrypted amplitude of the object 132. From Eq. (4) it is straightforward to show that the encrypted phase, $\phi_E(x,y)$, of the hologram is given by:

$$\phi_E(x, y) = \phi_H(x, y) - \varphi_R(x, y) = \arctan\left(\frac{I_4 - I_2}{I_1 - I_3}\right) \quad (5)$$

The encrypted amplitude, $A_E(x,y)$, of the hologram can be calculated from the following equation:

$$A_E(x, y) = A_H(x, y)A_R(x, y) = \frac{1}{4}[(I_1 - I_3)^2 + (I_4 - I_2)^2]^{1/2} \quad (6)$$

Figure 10:
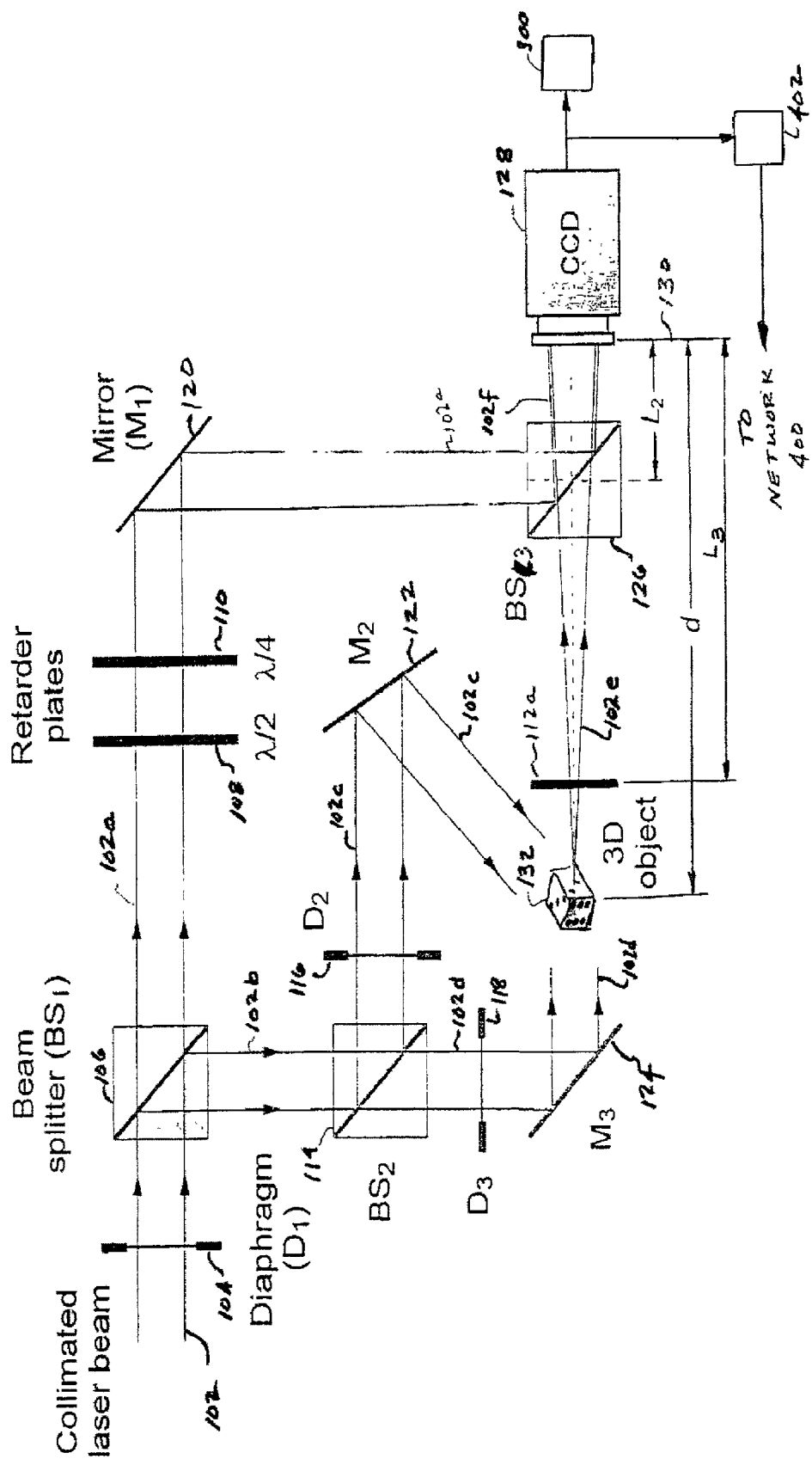
FIG. 10 is a second schematic diagram of a phase-shifting holographic system for encrypting multi-dimensional information.
Figure 11:
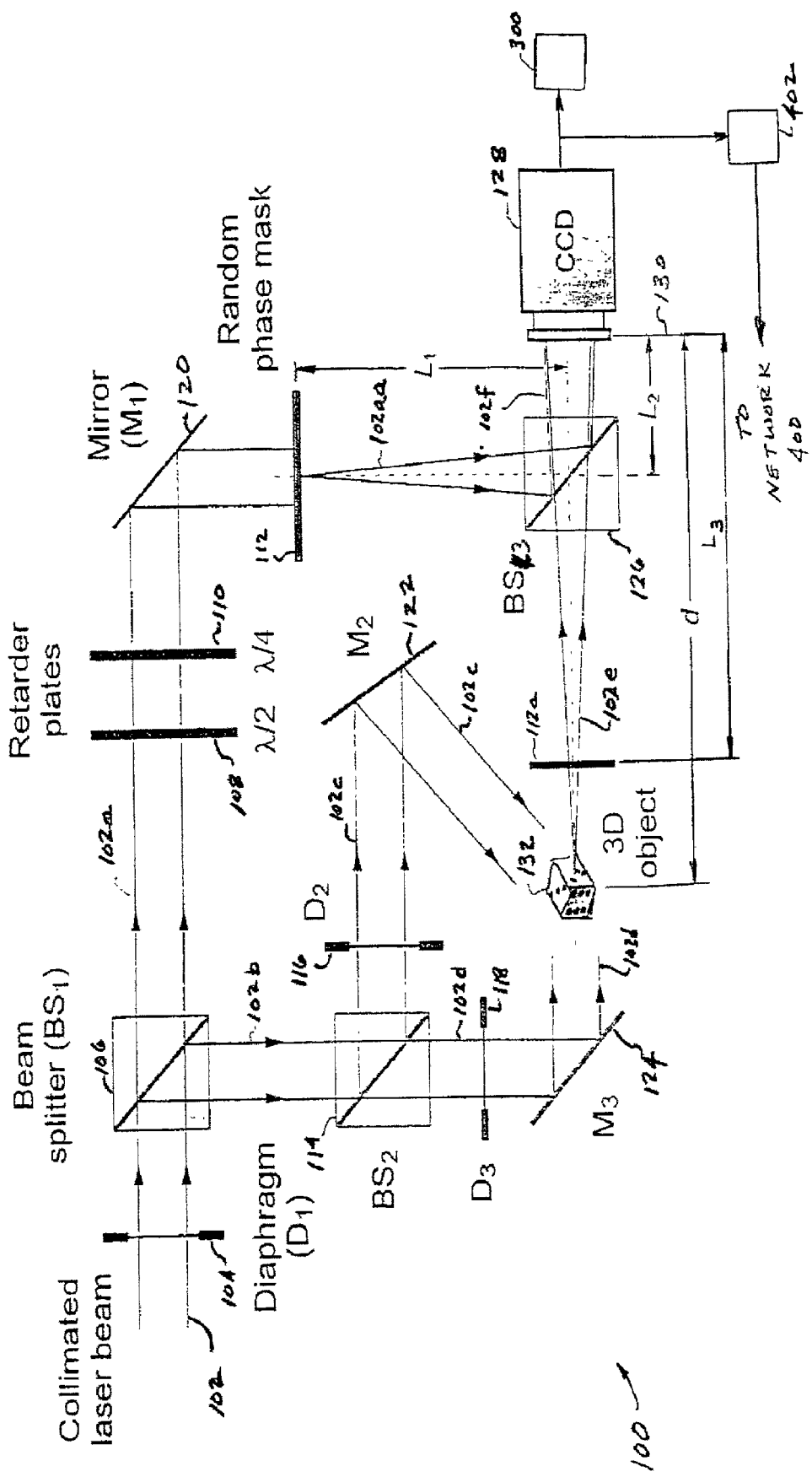
FIG. 11 is a third schematic diagram of a phase-shifting holographic system for encrypting multi-dimensional information.

For simplicity, the spatial dependence of $I_p(x,y)$ has been omitted from Eqs. (5) and (6). The two functions given by Eqs. (5) and (6), i.e., the amplitude $A_E(x,y)$ and the phase $\phi_E(x,y)$, constitute the encrypted image. Without knowledge of the functions $A_R(x,y)$ and $\phi_R(x,y)$, which act as keys for decryption, it is very difficult to recover the amplitude $A_H(x,y)$ and phase $\phi_H(x,y)$ in order to reconstruct images of the three-dimensional object 132 by inverse Fresnel propagation. Alternatively, the random phase mask 112 and its three-dimensional position can also act as the key. In contrast with other phase encryption methods, not only the phase, but also the amplitude, of the diffraction pattern of the object 132 is modified by the introduction of the random phase mask 112 into the reference beam 102a. Furthermore, instead of a Fraunhofer diffraction pattern, a Fresnel diffraction pattern of the object 132 is used for encryption. Therefore, phase retrieval algorithms are difficult to apply. Still further, by dealing with Fresnel diffraction patterns, the intensity of the output images is properly adapted to the dynamic range of the CCD 128. As seen in FIG. 10, it is also possible to effect encryption of the object 132 by utilizing a random phase mask 112a located a distance $L_3$ from the output plane 130 within the object beam 102e and without the random phase mask 112 in the reference beam 102a. In addition, it will be appreciated that the random phase masks 112a, 112 of FIGS. 1 and 10 may be utilized in combination to accomplish encryption of the object 132 as shown in FIG. 11. This improves security, as the number of keys is increased, but it would be necessary to perform two Fresnel propagation steps to reconstruct the object 132. The following are incorporated herein by reference in their entirety: P. Refregier and B. Javidi, *Optical Image Encryption Using Input and Fourier Plane Random Phase Encoding*, Journal of Optics Letters, vol. 20, pp. 767–769, Apr. 1, 1995; B. Javidi, *Encrypting Information with Optical Technologies*, Physics Today, vol. 50, no. 3, March 1997; N. Towghi, B. Javidi, and Z. Luo, *Fully Phase Encrypted Image Processor*, Journal of the Optical Society of America A (Optics, Image Science and Vision), Vol. 16, No. 8, pp. 1915–1927 (August 1999).

To obtain the functions that can be used as keys for decrypting the encrypted information (or set of data), diaphragm D3 is open, diaphragm D2 closed and the object 132 is removed from the interferometer 100. Item 124 is a mirror. Now the reference beam 102aa and the object beam 102d interfere in-line at the output plane 130. In this way, a second set of four intensity patterns, $I'_p(x,y)$, are recorded by adjusting or shifting the phase of the reference beam 102a as before. Now, the phase key, $\phi_K(x,y)$, for decrypting the encrypted object (or set of data) is calculated from:

$$\phi_K(x, y) = \phi_C - \varphi_R(x, y) = \arctan\left(\frac{I'_4 - I'_2}{I'_1 - I'_3}\right) \quad (7)$$

and the amplitude key, $A_K(x,y)$, for decrypting the encrypted object, is calculated from:

$$A_K(x, y) = A_C A_R(x, y) = \frac{1}{4}[(I'_1 - I'_3)^2 + (I'_4 - I'_2)^2]^{1/2} \quad (8)$$

The parameters $\phi_C$ and $A_C$ are respectively, the constant phase and amplitude of the object beam 102d and can be replaced with constant values, such as 0 and 1 respectively.

In a first embodiment decryption is performed by combining $A_E(x,y)$ and $\phi_E(x,y)$ with $A_K(x,y)$ and $\phi_K(x,y)$ in the following way:

$$\phi_D(x, y) = \phi_E(x, y) - \phi_K(x, y) \quad (9)$$
and

-continued $$A_D(x, y) = \begin{cases} \dfrac{A_E(x, y)}{A_K(x, y)}, & \text{if } A_K(x, y) \neq 0 \\ 0 & \text{otherwise} \end{cases} \quad (10)$$

In a second embodiment, decryption can be performed directly form the intensity measurements in the following manner:

$$\phi_D(x, y) = \arctan\left[\frac{(I_4 - I_2)(I'_1 - I'_3) - (I_1 - I_3)(I'_4 - I'_2)}{(I_4 - I_2)(I'_4 - I'_2) - (I_1 - I_3)(I'_1 - I'_3)}\right] \quad (11)$$

and $$A_D(x, y) = \left[\frac{(I_1 - I_3)^2 + (I_4 - I_2)^2}{(I'_1 - I'_3)^2 + (I'_4 - I'_2)^2}\right]^{1/2} \quad (12)$$

In Eqns. 11 and 12, the two functions $I_{13}(x,y)=I_1(x,y)-I_3(x,y)$ and $I_{42}(x,y)=I_4(x,y)-I_2(x,y)$ constitute the encrypted information, while the functions $I'_{13}(x,y)=I'_1(x,y)-I'_3(x,y)$ and $I'_{42}(x,y)=I'_4(x,y)-I'_2(x,y)$ act as the decryption key.

The functions $A_D(x,y)$ and $\phi_D(x,y)$ constitute the amplitude and phase of the decrypted Fresnel hologram which is given by $U_D(x,y)=A_D(x,y) \exp[i\phi_D(x,y)]$. Except for constant factors, $U_D(x,y)$ reproduces the Fresnel hologram, $U_H(x,y)$, of the three-dimensional object 132 as set forth in Eqn. (1). Thus, by the free-space propagation of $U_D(x,y)$, the amplitude distribution of the object 132 can be reconstructed.

Figure 13A:
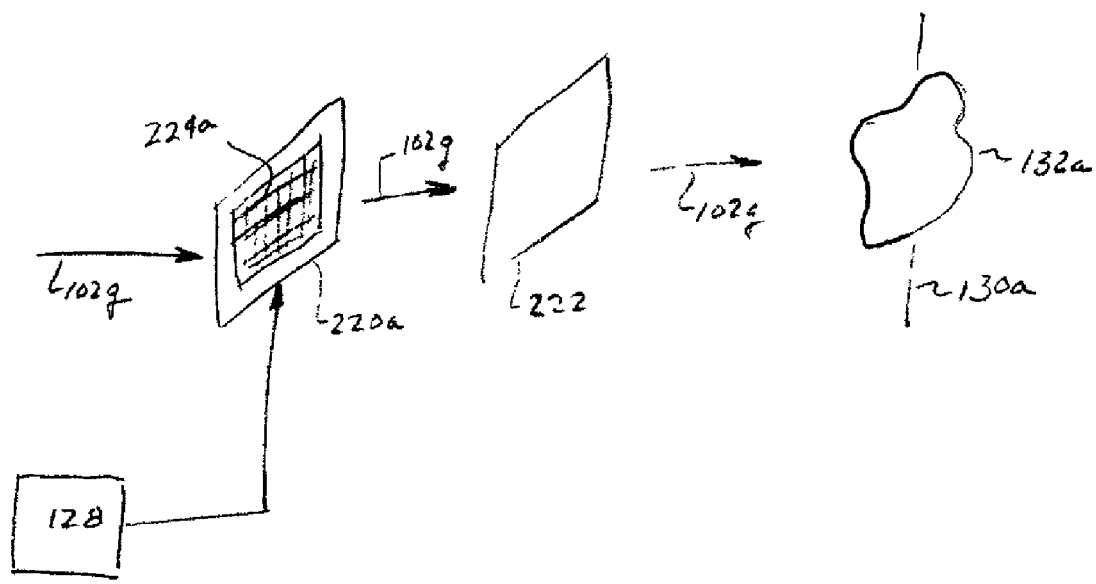
FIG. 13A is a first schematic representation of an optical reconstruction of an object from a hologram.
Figure 13B:
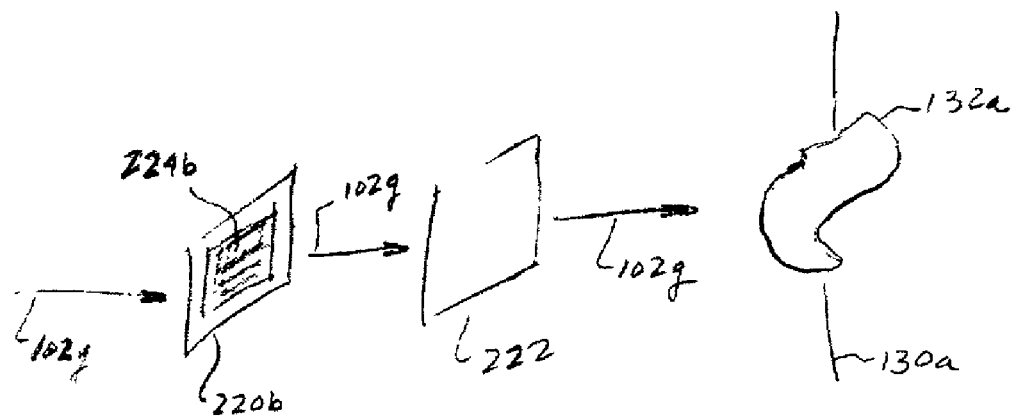
FIG. 13B is a second schematic representation of an optical reconstruction of an object from a hologram.

In FIG. 13A, the reconstruction of the object from encrypted or unencrypted holograms may be performed optically rather than digitally. An electrically addressable spatial light modulator 220a is interfaced with the detector 128. The digital holograms 224a are displayed on the electrically addressable spatial light modulator 220a. The encrypted or unencrypted hologram 224a is propagated by a reference wave 102g. The encrypted hologram is passed through an optical key 222 to reconstruct the original object 132a in a reconstruction plane 130a. The optical key 222 is not necessary for the unencrypted hologram. In FIG. 13B, the encrypted or unencrypted hologram 224b, such as an off-axis hologram, is formed by an optically addressable spatial light modulator 220b such as a liquid crystal light valve or Ferro-electric spatial light modulator. The encrypted or unencrypted hologram 224b is read out from the output of the optically addressable spatial light modulator 220b and propagated by a reference wave 102g. The encrypted hologram is passed through an optical key 222 to reconstruct the original object 132a in a reconstruction plane 130a. The optical key 222 is not necessary for the unencrypted hologram. As best understood from FIGS. 13A and 13B the optical key 222 may be in substantially the same plane as the spatial light modulators 220a, 220b and is shown separated for clarity. The following are incorporated herein by reference B. Javidi and J. L. Horner, *Real-time Optical Information Processing*, Academic Press, 1994, B. Javidi, *Optical Information Processing*, Encyclopedia of Electrical and Electronic Engineering, Volume on Optics, John Wiley, 1999.

Digital reconstruction of the object 132 is performed by numerically computing a Fresnel integral. Let $U_D(m,n)$ be the discrete amplitude distribution of a decrypted digital hologram, where m and n are discrete coordinates in the plane of the digital hologram, along the orthogonal directions x and y, respectively. In this way, $x=m\Delta x$ and $y=n\Delta y$, where $\Delta x$ and $\Delta y$ are the resolution of the detector. The discrete complex amplitude distribution, $U_O(m',n')$, of the reconstructed object, located at a plane orthogonal to the decrypted digital hologram, and at a distance d from the decrypted digital hologram, is given, aside from constant factors, by the following discrete Fresnel transformation:

$$U_o(m', n') = \exp\left[\frac{-i\pi}{\lambda d}(\Delta x'^2 m'^2 + \Delta y'^2 n'^2)\right] \quad (13)$$

$$\sum_{m'=0}^{N_x-1} \sum_{n'=0}^{N_y-1} U_D(m, n) \times \exp\left[\frac{-i\pi}{\lambda d}(\Delta x^2 m^2 + \Delta y^2 n^2)\right]$$

$$\exp\left[-i2\pi\left(\frac{m'm}{N_x} + \frac{n'n}{N_y}\right)\right]$$

In Eq. (13), m' and n' are discrete coordinates in the reconstruction plane, $\Delta x'$ and $\Delta y'$ denote the resolution in that plane, and $N_x$ and $N_y$ are the number of pixels of the detector along the x and y axis, respectively. It can be shown that the resolutions $\Delta x'$ and $\Delta y'$ along the horizontal and vertical directions of the reconstruction plane are given by:

$$\Delta x' = \frac{\lambda d}{N_x \Delta x}, \text{ and} \quad (14)$$

$$\Delta y' = \frac{\lambda d}{N_y \Delta y}$$

In this manner, the resolution of the image of the reconstructed object improves as the number of samples in the hologram plane increases.

Figure 2:
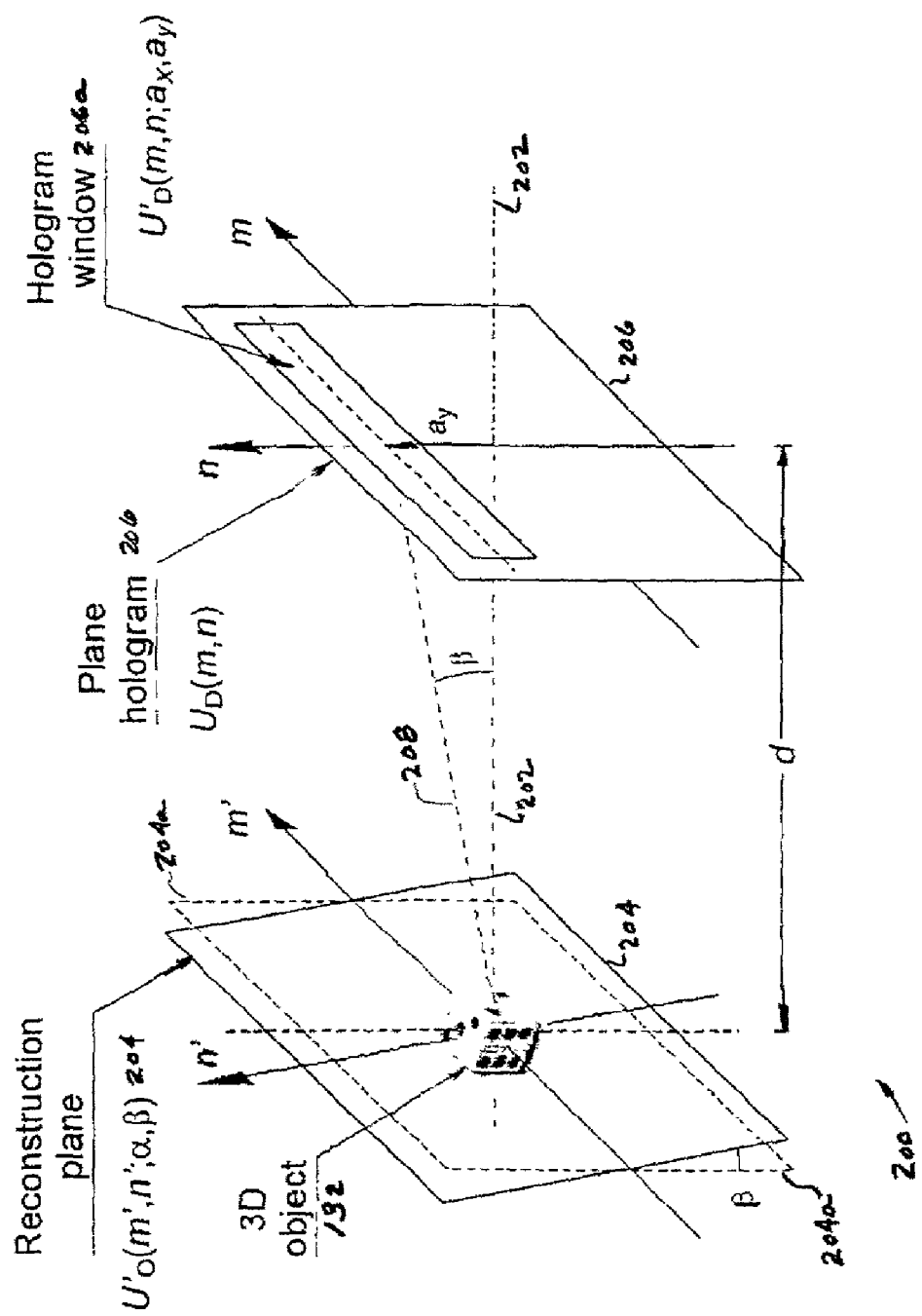
FIG. 2 is a schematic diagram of the location of the window in the hologram to generate different vertical perspectives.

Referring now to FIG. 2, a decrypted digital hologram is shown at 206. Different regions, or windows, of the decrypted digital hologram 206 record light arising from different perspectives, views or segments of the three-dimensional object 132. Thus, different perspectives, views, or segments, of the three-dimensional object 132 can be reconstructed by defining different windows 206a within the decrypted digital hologram 206 and illuminating the windows 206a with plane waves tilted at an angle of β with respect to the optical axis 202. To this end, assume that the input object 132 to be encrypted is located at a distance d from the CCD 128. To reconstruct a particular view of the decrypted three-dimensional object 132, a rectangular window 206a (or subset) is defined within the decrypted digital hologram 206 and centered at the location, $a_x, a_y$. The information contained within this window 206a corresponds to a particular direction of observation 208 that subtends angles α and β with respect to the optical axis 202. These angles are given by:

$$\alpha = \frac{a_x \Delta x}{d}, \text{ and} \quad (15)$$

$$\beta = \frac{a_y \Delta y}{d}$$

In FIG. 2, $a_x$ equals zero.

The decrypted digital hologram 206 is illuminated by a light beam directed towards the window 206a at angles α and β with respect to the optical axis 202 as given by Eq.

(15). In this manner, the perspective of the object 132 will remain centered in the reconstruction of the object 132. The angular range achieved will be limited only by the size of the detector.

From the above considerations, a partial discrete amplitude distribution, $U'_D(m,n;a_x,a_y)$, is defined over the window 206a within the decrypted digital hologram 206, and is used for reconstructing a segment of the object 132. The partial discrete amplitude distribution is given by:

$$U'_D(m, n; a_x, a_y) = \qquad (16)$$

$$U_D(m, n) \, rect\left(\frac{m - a_x}{b_x}, \frac{n - a_y}{b_y}\right) \exp[i2\pi(a_x m + a_y n)]$$

where rect(g,h) is the so called rectangle function and $b_x$ and $b_y$ denote the transverse size of the window 206a. The linear phase factor in Eq. (16) simulates the effect of a tilted plane wave incident upon the decrypted digital hologram 206. Now, the discrete complex amplitude distribution, $U'_O(m', n';\alpha,\beta)$, of a particular perspective, view or segment of the reconstructed object at a plane located at a distance d from the decrypted digital hologram 206 and tilted by angles $\alpha$ and $\beta$ with respect to the optical axis 202 can be computed using the following equation:

$$U'_o(m', n'; \alpha, \beta) = \exp\left[\frac{-i\pi}{\lambda d}(\Delta x'^2 m'^2 + \Delta y'^2 n'^2)\right] \qquad (17)$$

$$\sum_{m'=0}^{N_x-1} \sum_{n'=0}^{N_y-1} U'_D\left(m, n; \frac{\alpha d}{\Delta x}, \frac{\beta d}{\Delta y}\right) \times \exp\left[\frac{-i\pi}{\lambda d}(\Delta x^2 m^2 + \Delta y^2 n^2)\right]$$

$$\exp\left[-i2\pi\left(\frac{m'm}{N_x} + \frac{n'n}{N_y}\right)\right]$$

The introduction of the linear phase factor in Eq. (16) is equivalent to a tilted plane wave illuminating the hologram in Eq. (17).

The geometry of the configuration for the particular case of a vertical variation in the perspective of the object (e.g., restricted to $a_x$=0) is depicted in FIG. 2. The maximum angle of view, $\beta_{max}$, is a function of the CCD size and the window size, $\beta_{max}$=$(N_y-b_y)\Delta y/d$. This range in $\beta$ can be increased by increasing the size of the CCD or by decreasing the size of the window used for reconstruction. However, as pointed out in Eq. (14), the resolution of the reconstructed object decreases by selecting smaller windows. Nevertheless, the hologram window 206a does not need to be square. Therefore, when a set of perspectives is obtained in only one direction, it is possible to improve the resolution of the object reconstruction by increasing the size of the hologram window 206a in the transverse direction, as is shown in FIG. 2.

Equation (17) can be efficiently computed using a fast Fourier transform algorithm (J. W. Cooley, J. W., Tukey, "An Algorithm For The Machine Calculation Of Complex Fourier Series," *Math. Comput.* 19, 297–301 (1965) which is incorporated herein by reference). Thus, different perspectives can be generated at high speed. Points on the surface of the object 132 at distances z from the hologram where z≠d will appear defocused in the image of the reconstructed object. Nevertheless, the planes of reconstruction can also be changed easily in the computer starting from the same digital hologram. The field of focus can be increased by diminishing the size of the hologram window 206a at the expense of a reduction in resolution.

Figure 3:
FIG. 3 is an image of the three-dimensional object to be encrypted obtained by phase-shifting interferometry with the system in FIG. 1 without a reference phase mask.

Encryption of a three-dimensional object was performed with the phase-shifting interferometer 100 depicted in FIG. 1. A mega-pixel camera 128 with pixel size equal to 9×9 μm was used to record the interference patterns between the object beam 102c, 102e and the reference beam 102aa with a dynamic range equivalent to 256 grey levels. The object 132 was the shape of a cube of about 10 mm lateral size. In FIG. 3 an axial view of the object 132 reconstructed from a non-encrypted digital hologram using Eq. (13) is shown. The object 132 was located at a distance of d equal to about 570 mm from the camera 128 and without a phase mask in the reference beam 102a. Diaphragm D2 was open and diaphragm D3 was closed in order to illuminate the three-dimensional object 132. The resolution of the re-constructed image was limited by the size of the camera 128, which acts as an aperture in the reconstruction process, as is shown in Eq. (14). The quality of the image is also affected by speckle. The speckle size is, roughly speaking, equal to 1.2 $\lambda$/NA, where NA is the numerical aperture of the system. Thus, the size of the speckle is approximately equal to the resolution of the image of the reconstructed object given by Eq. (14).

Figure 4B:
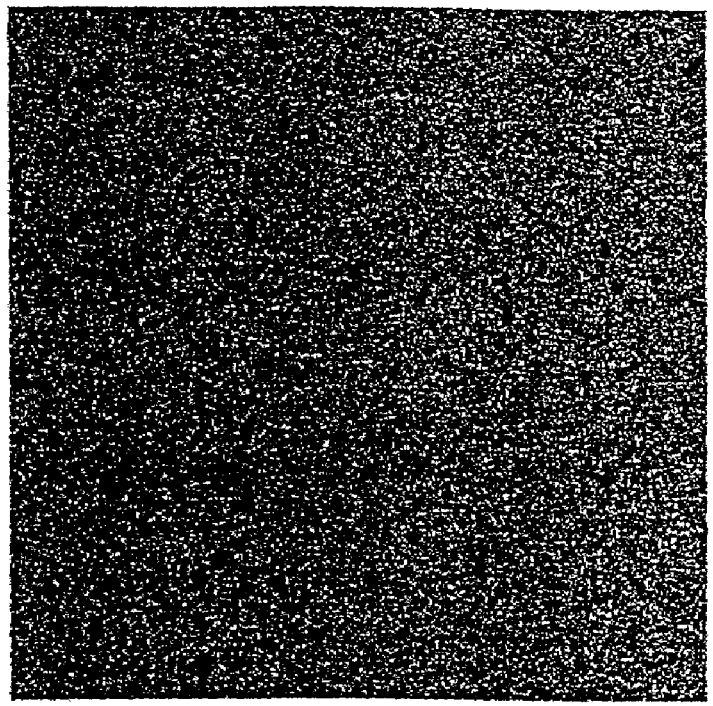
FIG. 4B is a gray-level representation of the encrypted phase of the object of FIG. 3 by using a random reference phase mask.
Figure 4A:
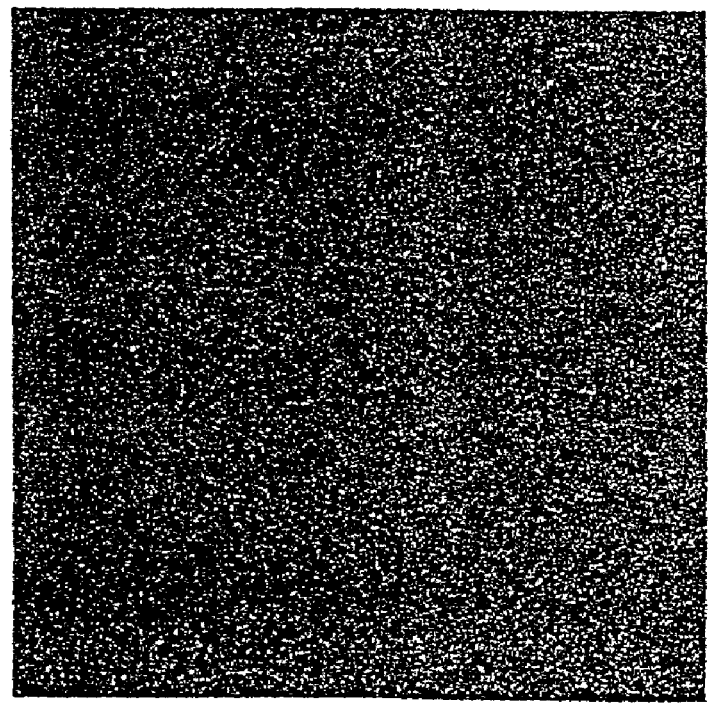
FIG. 4A is a gray-level representation of the encrypted amplitude of the object of FIG. 3 by using a random phase mask.

FIG. 4A is a gray-level representation of the encrypted amplitude of the object computed from Eqn. (6) using a random phase mask as in FIG. 1. FIG. 4B is a gray-level representation of the encrypted phase of the object computed from Eqn. (5) using a random phase mask as in FIG. 1. The random phase mask 112 was a plastic diffuser of randomly varying thickness with a correlation length of about 6 μm in both the x and y directions.

Figure 5B:
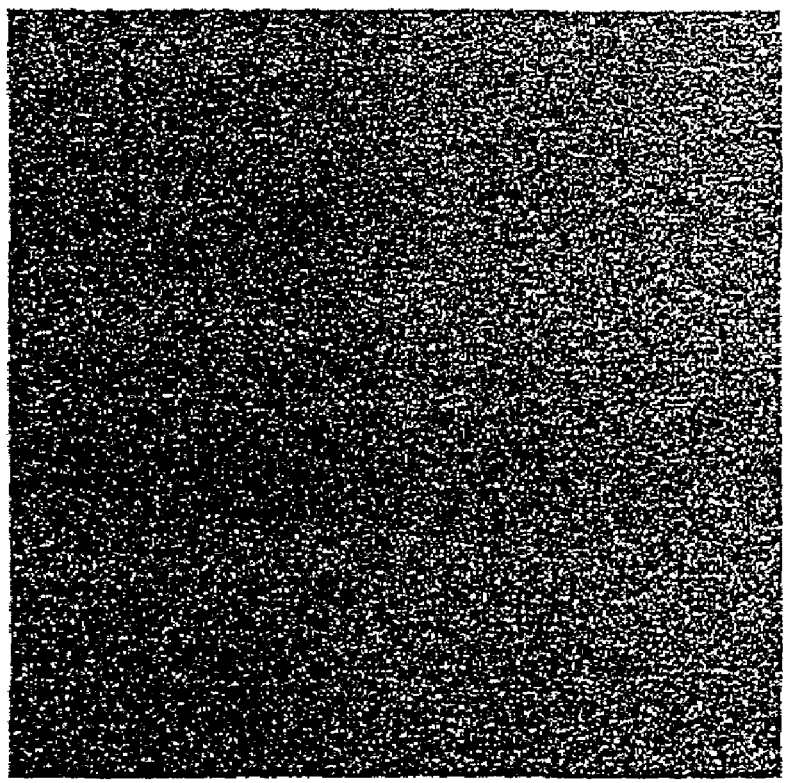
FIG. 5B is a representation of the key phase of the random phase mask used to encrypt the information in FIG. 4B.
Figure 5A:
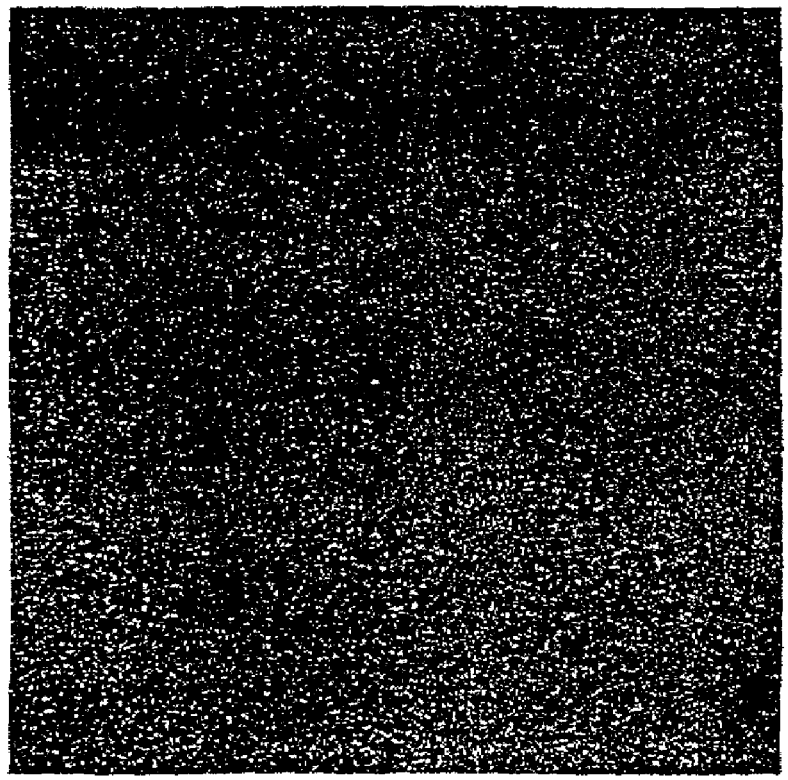
FIG. 5A is a representation of the key amplitude of the random phase mask used to encrypt the information in FIG. 4A.
Figure 6B:
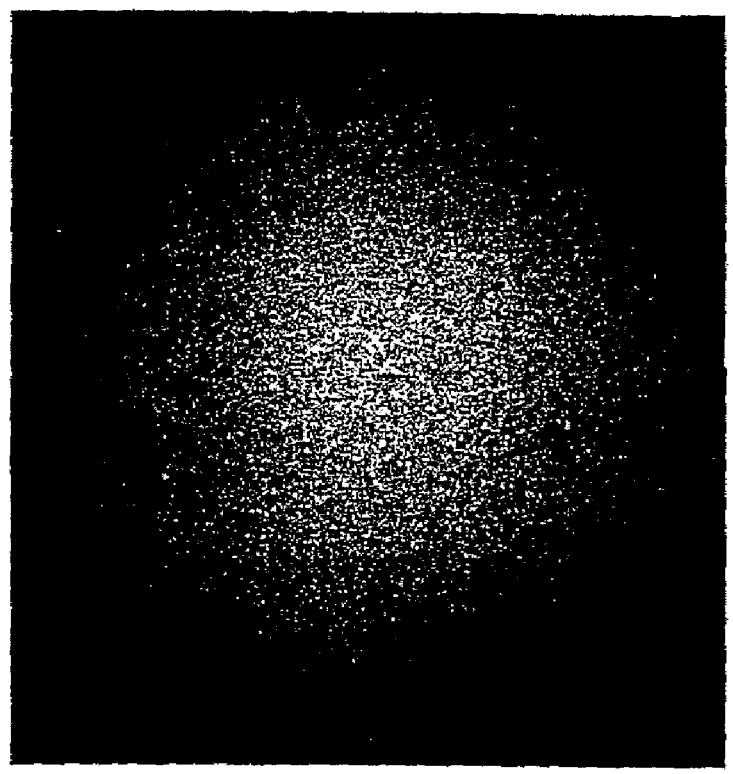
FIG. 6B is the result of the incorrect decryption of the encrypted information in FIGS. 4A and 4B using a wrong phase key.
Figure 6A:
FIG. 6A is the result of the decryption of the encrypted information contained in FIGS. 4A and 4B using the key in FIG. 5.

FIG. 5A is a gray-level representation of the amplitude key used to decrypt the information in FIG. 4A. FIG. 5B is a representation of the phase key used to decrypt the information in FIG. 4B. The amplitude and phase keys of FIGS. 5A and 5B were generated at the output plane 130 utilizing the random phase mask 112 and by removing the object 132, closing diaphragm D2 and opening diaphragm D3. From the encrypted and key interference patterns the decrypted hologram is obtained by using Eqs. (9) and (10) or Eqs. (11) and (12). The decrypted image shown in FIG. 6A was generated using the entire decrypted hologram. By way of comparison, FIG. 6B shows a decryption performed without the correct keys. Noise in the image of the decrypted object arises from errors, generated by the random phase mask 112, in the evaluation of the Fresnel diffraction pattern in the CCD. These errors are due to the limited size of the detector pixels and the grey-level quantization.

Figure 7C:
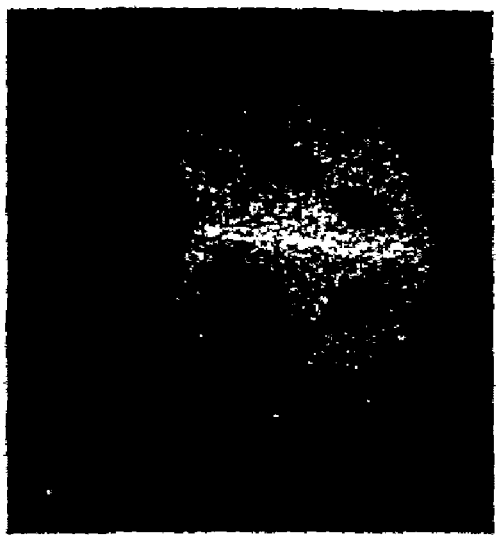
FIG. 7C is a third perspective of the three-dimensional object after decryption at an angle of view of $\beta \sim 0.7°$.
Figure 7B:
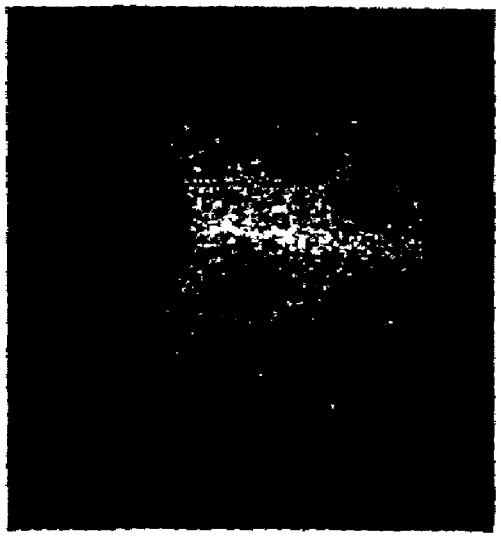
FIG. 7B is a second perspective of the three-dimensional object after decryption at an angle of view of $\beta \sim 0°$.
Figure 7A:
FIG. 7A is a first perspective of the three-dimensional object obtained after decryption at an angle of view of $\beta \sim 0.7°$.
Figure 8A:
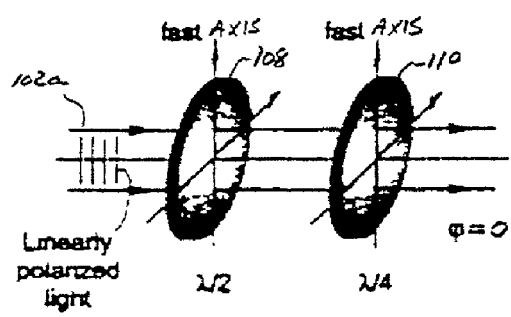
FIG. 8 is a representation of the four step method of inducing a phase shift in the reference beam.
Figure 8B:
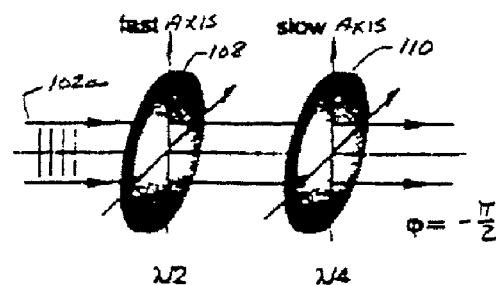
Figure 8C:
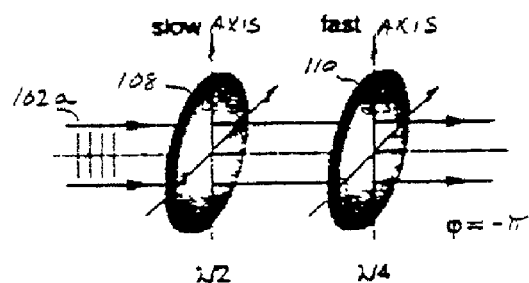
Figure 8D:
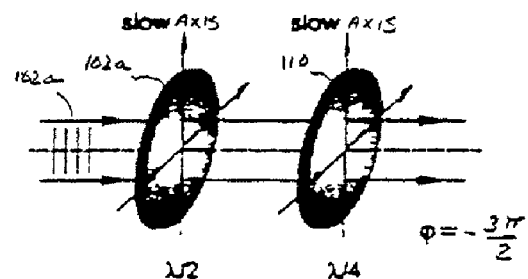

FIG. 7 shows different perspectives of the decrypted three-dimensional object 132 reconstructed from the decrypted digital Fresnel hologram 206. A rectangular window 206a was used limited to a vertical size, by, of 256 pixels and horizontal size, $b_x$, equal to the size of the CCD. The size reduction is used to reconstruct different perspectives from different regions 206a of the decrypted digital hologram 206. However, this also reduces the resolution and, consequently, the quality of the images with respect to those obtained using the whole decrypted digital hologram 206. Thus, only the size of the window 206a in the direction for which different views of the three-dimensional object 132 are need is reduced (e.g. in they direction in the example of FIG. 2). In this embodiment, the window 206a was displaced only in the vertical direction generating an angular difference of about 0.7 degrees between the different perspectives shown in FIGS. 7A, 7B and 7C. Any other view angle, limited only by the size of the CCD, can be reconstructed in the same way.

Referring to FIG. 9, the detector 128 is shown connected to a distributed computer or communications network 400, such as a local area network (LAN) or a wide area network (WAN) via a computer 402. The detector 128 may also be connected directly to a liquid crystal display (LCD), liquid crystal television (LCTV) or an electrically or optically addressable spatial light modulator or ferroelectric spatial light modulator 412a. The computer network 400 includes a plurality of similar client personal computers 404 connected to a server 410 from remote geographical locations by wired or wireless connections, by radio based communications, by telephony based communications, or by other network-based communications. The computer 402 may also be connected directly to another like computer 402 or to a display device 412, such as a liquid crystal display (LCD), liquid crystal television (LCTV) or an electrically, or optically addressable spatial light modulator (SLM) for optical reconstruction of the 3D object 132 or set of data. The computer network 400 is in turn similarly connected to other computers 502 or networks 504 through the Internet 500. The computers 402, 404, 504, display devices 412, 412a and other devices of the networks 400, 500, 504 are configured to execute program software, that allows them to send, receive, record, store and process the encrypted and decrypted holograms, the encrypted sets of data, decryption keys and decrypted sets of data between and amongst themselves via the networks 400, 504 and the Internet 500. Such processing includes, for example, various image compression and decompression, filtering, contrast enhancement, image sharpening, noise removal and correlation for image classification. Decompressed images may be displayed on display devices such as liquid crystal displays, liquid crystal TVs or electrically or optically addressable spatial light modulators. This embodiment has applications in the serial three dimensional imaging of moving objects, such as in three dimensional TV, three dimensional video, three dimensional movies as well as three dimensional display and three dimensional visualization and other similar applications. Thus serial images may be formed of moving objects by forming a series of original encrypted holograms of the moving objects; compressing the series of original encrypted holograms of the moving objects to form a series of compressed encrypted holograms; decompressing the series of compressed encrypted holograms to form a series of decompressed encrypted holograms; and reconstructing the moving objects from the series of decompressed encrypted holograms to form a series of multi-dimensional images of the moving objects.

Thus, based upon the foregoing description, an optoelectronic holographic method and system for encrypting and decrypting multi-dimensional information or data, based upon phase-shifting interferometry, has been shown. Such method allows for the securing of three-dimensional scenes or data. The holographically encrypted data can be transmitted through conventional digital communication channels to remote locations and the data decrypted and reconstructed digitally or optically. Different views or segments of the decrypted three-dimensional object can be reconstructed at different axial distances and at different perspectives. Since an optical system is utilized to record the digital hologram, optical encryption with a random phase mask represents a convenient way to secure both two and three-dimensional objects or information. Furthermore, in this manner, to increase security, the method allows for the avoidance of electronic transmission of decryption keys if so desired. Still further, other electronic encryption methods can also be applied to the digital hologram. In the methods of this invention, after electronic transmission of the encrypted information or data, decryption is carried out digitally or optically. Alternatively, decryption can be performed optically by generating the decrypted digital hologram as a computer generated hologram and displaying it, for example, on an electrically addressable spatial light modulator, liquid crystal television or liquid crystal display.

In accordance with a second embodiment of the invention, an optical encryption method based upon digital phase-shifting interferometry may be used to record the fully complex encrypted information. Fourier and Fresnel domain optical encryption is achieved by the use of one or more random phase masks attached to the input in the object beam and another phase mask at a variable position in the reference beam of a Mach-Zehnder phase-shifting interferometer. The fully complex key to be used in the decryption process is also obtained by phase-shifting interferometry. The encrypted information can easily be transmitted over digital communication lines, and the key can be transmitted either electronically or by means of making controlled copies of the reference phase mask used in the encryption procedure. The decryption can thus be performed either electronically or optoelectronically.

The encryption is performed immediately and directly on the fully complex information and that the decryption procedure, if performed electronically, requires no more computation than the usual image reconstruction procedures. Therefore the potential for a significant speed advantage over fully digital encryption techniques is quite apparent. After decryption, electronic reconstruction with a one-step fast Fourier transform (FFT) procedure or optical reconstruction methods can be applied. With optical decryption, the correct phase key must be positioned in three-dimensional space to successfully decrypt the data.

Figure 14:
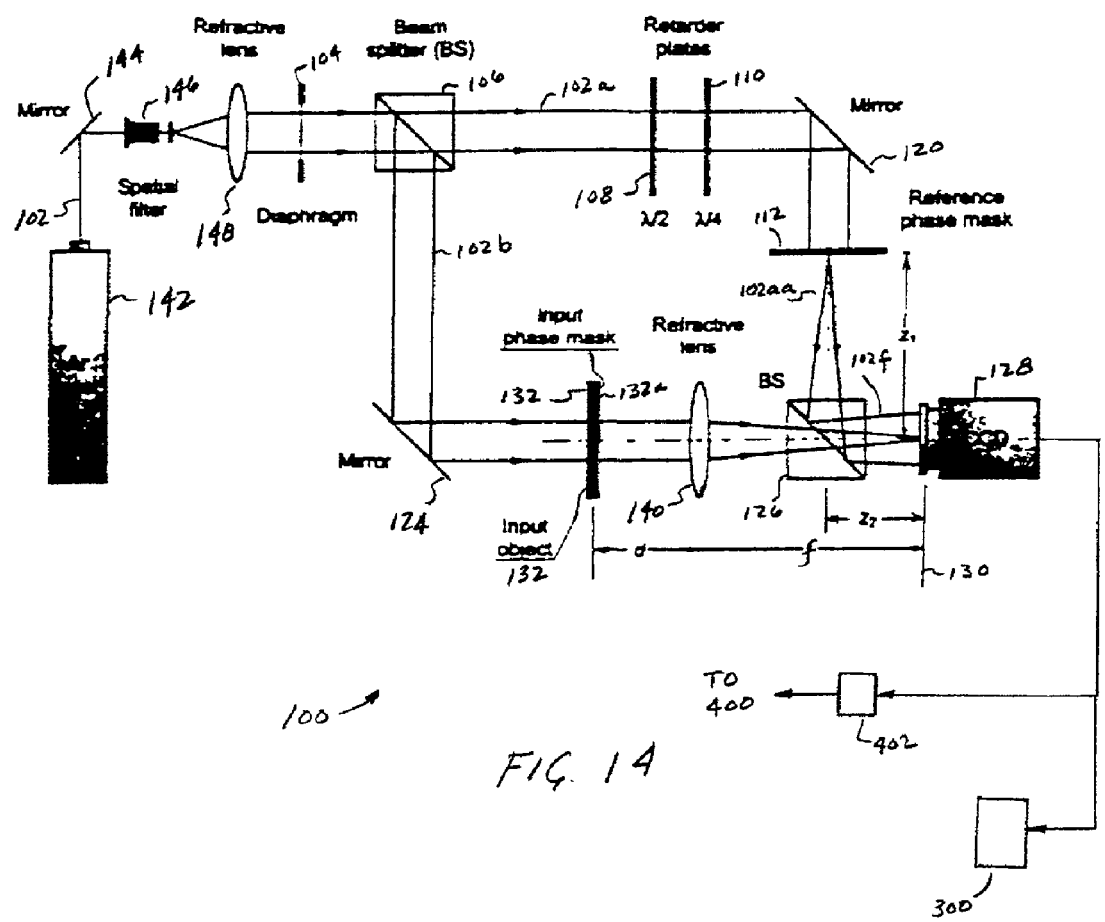
FIG. 14 is a schematic representation of a phase-shifting interferometer configured to perform Fourier encryption of an input object with two random phase masks.

In FIG. 14, in an interferometer 100, such as a Mach-Zehnder interferometer, an argon laser beam 102, is expanded 146, collimated 148, and divided by a beam splitter 106 into two plane wave fronts traveling in different directions. These are the object beam 102b and the reference beam 102a. After reflecting in a mirror 124, the object beam 102b impinges on a multi-dimensional input object or transparency 132, whose amplitude transmittance, t(x,y), contains the data to be encrypted. A refractive lens 140 forms a representation of the Fourier transform of the input into the output plane 130 of a CCD detector 128 through the second beam splitter 126. The detector is connected to a distributed computer or communications network 400 as in FIG. 9. To improve the dynamic range of the Fourier transform in the output plane 130, and to make it more difficult to obtain the power spectra of the input object 132, a random phase mask 132a, with phase $\phi_1(x,y)$ is attached to the input object 132. Therefore, aside from constant factors, the complex amplitude distribution, $U_0(x,y)$, of the Fraunhofer diffraction pattern at the output plane 130 is approximated by:

$$U_0(x, y) = \exp\left[i\frac{\pi}{f}\left(1 - \frac{d}{f}\right)(x^2 + y^2)\right] \times \qquad (18)$$

$$\int\int_{-\infty}^{\infty} t(x', y')\exp[i\phi_1(x', y')] \times \exp\left[-i\frac{2\pi}{\lambda f}(xx' + yy')\right]dx'dy'$$

where d is the distance between the input and the refractive lens, f is the focal length of the lens, and $\lambda$ is the wavelength of the laser beam 102. Aside from the phase factor outside the integral, the complex amplitude distribution is the Fourier transform of the product of the input transmittance and the input phase mask. A Fourier transformation is obtained when d=f. By measuring the amplitude and the phase of, $U_O(x,y)$, we can recover the amplitude of the input function t(x,y), from the inverse Fourier transform intensity.

The parallel reference beam passes though two phase retarders 108, 110, one quarter and one half wave plate; is reflected by a mirror 120; and is modified by a second random phase mask 112. The system is aligned such that, without the phase mask 112, the reference beam 102a generates a plane wave 102f traveling perpendicular to the CCD 128 sensor after reflecting in the second beam splitter 126. The light provided by the argon laser 142 is linearly polarized. In this way, by suitable orientation of the phase retarders 108, 110, the phase of the reference beam 102a can be changed, as shown in FIGS. 8A–8D. Assume that the phase of the parallel beam 102a after the second plate 110 is $\phi_o$ when the fast axes of both plates 108, 110 are aligned with the direction of polarization of the incident light 102a. By successively aligning the different slow and fast axes of the phase retarders 108, 110 with the direction of the polarization, phase values $\phi_o+\alpha$ with $\alpha=-\pi/2$, $-\pi$ and $-3\pi/2$ can be produced with high accuracy, as shown in FIGS. 8A–8D.

The reference phase mask 112 has a random phase distribution $\phi_2(x,y)$ and is placed at a distance $z=z_1+z_2$ from the CCD 128, as shown in FIG. 14. The complex amplitude distribution of the reference beam as in the output plane 130 can be calculated by use of the Fresnel-Kirchhoff integral with the following expression $$U_R(x,y;\alpha) = \exp(i\alpha)\left[i\frac{\pi}{\lambda z}(x^2+y^2)\right] \times \int\int_{-\infty}^{\infty} \exp[i\phi_2(x',y')] \quad (19)$$
$$\exp\left[i\frac{\pi}{\lambda z}(x'^2+y'^2)\right] \times \exp\left[-i\frac{2\pi}{\lambda z}(xx'+yy')\right] dx'\,dy'$$

where $\alpha$ denotes the relative phase changes introduced by the retarder plates 108, 110 on the reference beam 102a. Constant phase factors are omitted in Eqn. 19.

The intensity pattern recorded by a linear intensity recording device, such as a CCD camera 128, is then given by $$I(x,y;\alpha)=|U_o(x,y)+U_R(x,y;\alpha)|^2 \quad (20)$$

with $U_O$ and $U_R$ given by Equations 18 and 19, respectively. Since Eqn. 19 provides a random-noise-like phase and amplitude distribution, the image provided by the CCD 128 will also look like a random intensity distribution.

The complex light field at the output plane 130 can be evaluated with digital phase-shifting interferometry when four intensity patterns are recorded with the reference beam 102a phase shifted by $\alpha=0$, $\pi/2$, $\pi$ and $3\pi/2$. The phase shifting is accomplished by suitable orientation of the retarder plates 108, 110 located in the path of the reference beam 102a (see FIG. 8A–8D). Denoting the complex amplitude distribution of the object 132 and the reference beams 102a at the output plane 130 with $U_0=A_o(x,y)\exp[i\phi(x,y)]$ and $U_R=A_R(x,y)\exp\{i[\phi(x,y)+\alpha]\}$ respectively, Eqn. 20 can be rewritten as $$I(x,y;\alpha)=[A_o(x,y)]^2+[A_R(x,y)]^2+2A_o(x,y)\times A_R(x,y)\cos[\phi_o(x,y)-\phi(x,y)-\alpha] \quad (21)$$

In this way it can be shown that the phase $\phi_E(x,y)$ provided by this phase-shifting interferometric technique is given by $$\phi_E(x,y) = \phi_o(x,y) - \varphi(x,y)\arctan\left[\frac{I(x,y;-3\pi/2)-I(x,y;-\pi/2)}{I(x,y;0)-I(x,y;-\pi)}\right] \quad (22)$$

The amplitude, $A_E(x,y)$, can be calculated from the following equation:

$$A_E(x,y) = A_o(x,y)A_R(x,y) = \frac{1}{4}\frac{I(x,y;0)-I(x,y;-\pi)}{\cos[\phi_o(x,y)-\varphi(x,y)]} \quad (23)$$

where the argument of the cosine function in the denominator is obtained directly from Eq. 22.

It is difficult to recover the complex amplitude distribution, $U_O(x,y)$, generated by the object beam 102b. Since $\phi(x,y)$ and $A_R(x,y)$ are random functions, the phase $\phi_o(x,y)$ and the amplitude, $A_o(x,y)$ can not be obtained from Eqns. 22 and 23, respectively. Thus, it is difficult to obtain the input function, t(x, y), by an inverse Fourier transformation. The input data are encrypted such that they can be decrypted only with knowledge of the reference complex amplitude distribution $U_R(x,y;0)$ or the reference phase mask $\phi_2(x,y)$ and its three-dimensional position, which is acting as a key. The phase and the amplitude given by Eqns. 22 and 23, respectively, can be simply understood as the phase and the amplitude of the product of the Fourier complex amplitude, $U_O(x,y)$, with a second random complex amplitude distribution, which is the complex conjugate of $U_R(x,y;0)$. When the reference phase mask 112 is imaged over the output detector 128 instead of using Fresnel propagation, the encrypted image is that which is achieved by the double phase method. However, with this new technique we improve on the security extending the encryption to the Fresnel domain, and we can store, process and transmit the encrypted information easily without the help of holographic recording media. In FIG. 15A, a diagram of the encryption procedure is shown.

To decrypt the information and obtain the original complex amplitude distribution $U_O(x, y)$, we also use the phase-shifting interferometry technique to achieve the key complex distribution $U_R(x, y;0)$. By removing the input transparency 132, the input phase mask 132a, and the Fourier transforming lens 140 in the optical system 100 in FIG. 14, the phase and the amplitude of the Fresnel diffraction pattern generated by the reference phase mask 112 can be measured. In this case, the intensity at the output plane 130 is given by:

$$I'(x,y;\alpha)=|A_c\exp(i\phi_c)+U_R(x,y;\alpha)|^2 \quad (24)$$

where $A_C$ and $\phi_C$ are the constant amplitude and phase, respectively, of the object beam at the output plane. The phase, $\phi_K(x, y)$, and the amplitude, $A_K(x, y)$, provided by the phase-shifting interferometry technique are now $$\phi_K(x,y) = \phi_c - \varphi(x,y) = \arctan\left[\frac{I'(x,y;-3\pi/2)-I'(x,y;-\pi/2)}{I'(x,y;0)-I'(x,y;-\pi)}\right] \quad (25)$$

$$A_K(x,y) = A_c A_R(x,y) = \frac{1}{4}\frac{I(x,y;0)-I(x,y;-\pi)}{\cos[\phi_o-\varphi(x,y)]} \quad (26)$$

respectively.

Parameters $\phi_c$ and $A_c$ in Eqs. 25 and 26 are only constant factors and thus can be simply substituted by 0 and 1, respectively. Thus Eqs. 25 and 26 allow us to obtain directly the key functions $\phi(x, y)$ and $A_R(x, y)$. The complex amplitude distribution $U_o(x, y)$ can be obtained when we combine Eqs. 25 and 26 with Eqs. 22 and 23 in the following way:

$$\phi_o(x, y) = \phi_E(x, y) - \phi_K(x, y) \tag{27}$$

$$A_o(x, y) = \begin{cases} \dfrac{A_E(x, y)}{A_K(x, y)}, & \text{if } A_K(x, y) \neq 0 \\ 0 & \text{otherwise} \end{cases} \tag{28}$$

A diagram of the procedure for obtaining the key is shown in FIG. 15B. By proper propagation of the previously obtained complex amplitude distribution, $U_0(x, y)$, with the Fresnel-Kirchhoff integral, it is possible to obtain the intensity distribution in any other plane of the incident light beam within the paraxial approximation. In particular, the input object intensity can be recovered by an inverse Fourier transformation. FIG. 15C corresponds to the diagram of the decryption procedure. The reconstruction can be implemented both optical and digitally. For the direct computer reconstruction we perform the following inverse discrete Fourier transformation of the complex amplitude distribution characterized by Eqs. 27 and 28, i.e., $$|t(m, n)|^2 = \left| \sum_{m'=0}^{N-1} \sum_{n'=0}^{N-1} U_o(m', n') \exp\left[i\frac{2\pi}{N}(mm' + nn')\right] \right|^2 \tag{29}$$

where m' and n' are the discrete spatial coordinates in the CCD plane 130 and m, n are those corresponding to the object plane. If we consider only the horizontal transversal direction, we have x'=m' $\Delta$x'=m$\Delta$x', with $\Delta$x' and $\Delta$x as the spatial resolutions in the CCD plane 130 and the input plane 132, 132a respectively. In Eq. 29 we assume that the number of pixels in both orthogonal directions of the CCD 128 is the same, denoted by N. Extension to different number of pixels is straightforward. Eqn. 29 can be calculated through a FFT algorithm.

The resolution of the technique can be evaluated taking into account the physical size of the CCD 128 and the configuration of optical system 100. The scale factor of the optical Fourier transform operation performed by the system in FIG. 14 is x'/u=$\lambda$f, where u is the spatial frequency in the horizontal direction. However, it can be shown that the scale factor of the computer Fourier transformation in Eqn. 29 is x'/u=N$\Delta$x'$\Delta$x. By comparing both equations, we have the following resolution in the input plane 132, 132a, $$\Delta x = \frac{\lambda f}{N \Delta x'} = \frac{\lambda f}{T'} \tag{30}$$

where T' is the transversal size of the CCD 128. We can improve on the resolution by using a shorter wavelength, a longer focal length of the Fourier transforming lens 140, or by increasing the size of the CCD 128.

An optical reconstruction will also be possible by simple coding of the phase and the amplitude given by Eqs. 27 and 28, respectively, into two LCD's configured to work in only phase and amplitude, respectively, and by means of performing an optical Fourier transform with a single lens.

The Fourier encryption can be modified in different ways when we change the optical setup in FIG. 14. For example, the reference random phase mask 112 can either be imaged or Fourier transformed at the output plane 130 instead of free-space propagated. The optical transformation applied to the object beam 102b can also be similarly modified. This section explains how to modify the previous system into a lensless architecture. This modification allows for a more compact and versatile optical system and improves the security. Now, to decrypt the information, it is necessary to know the position of the input object 132 and the wavelength, $\lambda$, of the light beam 102b.

Figure 16:
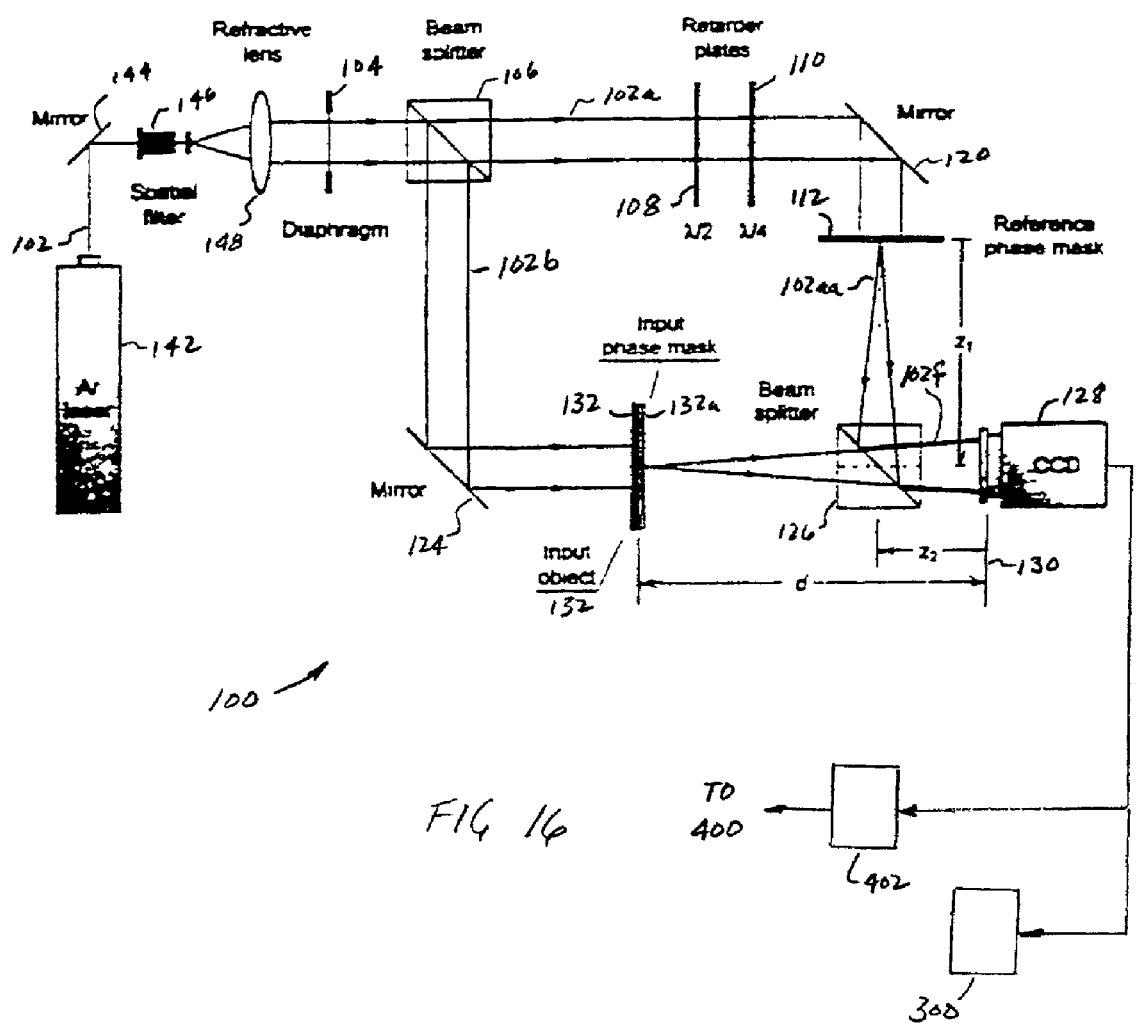
FIG. 16 is a schematic representation of a phase shifting interferometer configured to perform Fresnel encryption of an input object.

The optical configuration is depicted in FIG. 16. The object beam 102b is still incident on the input transparency 132, with the input phase mask 132a bonded, but the diffracted light travels by free-space propagation directly to the CCD camera 128. In the situation the complex amplitude distribution that is due to the object beam 102b over the CCD 128 can be evaluated from the following expression:

$$U_o(x, y) = \exp\left[i\frac{\pi}{\lambda d}(x^2 + y^2)\right] \tag{31}$$

$$\int_{-\infty}^{\infty} \int t(x', y') \exp[i\phi_i(x', y')] \times \exp\left[i\frac{\pi}{\lambda d}(x'^2 + y'^2)\right]$$

$$\exp\left[-i\frac{2\pi}{\lambda d}(xx' + yy')\right] dx' dy'$$

By use of phase-shifting interferometry, Eqs. 22 and 23 provide the encrypted phase and amplitude of the input signal. Both images will look like random distributions, owing to the action of the input and the reference phase masks. The key images are obtained as well from Eqs. 25 and 26 by phase-shifting interferometry after removal of the input function 132 and the input phase mask 132a from the optical system 100. With only these key images it is possible to decrypt the stored information by use of Eqs. 27 and 28.

Again, the reconstruction of the encrypted information, t(x, y), can be implemented both optically or by computer. In this case we need information not only about the location of the input image 132 in the optical path of the interferometer 100 but also about the wavelength of the incident light and the pixel size of the CCD 128. Then, the computer reconstruction can be performed by applying an inverse discrete Fresnel transformation to simulate the free-space propagation. Thus the input information can be retrieved from the following equation, $$|t(m, n)|^2 = \tag{32}$$

$$\left| \sum_{m'=0}^{N-1} \sum_{n'=0}^{N-1} U_o(m', n') \exp\left[i\pi\frac{\Delta x'^2}{\lambda d'}(m'^2 + n'^2)\right] \exp\left[i\frac{2\pi}{N}(mm' + nn')\right] \right|^2$$

where it is assumed that the size of the pixels in both transversal directions is the same, denoted by $\Delta$x' and d'=–d. The evaluation of the Eq. 32 can be performed in the computer in a short time by use of FFT algorithm.

Now the resolution of the reconstruction depends on the distance d. By applying a reasoning similar to that in the Fourier encryption, it can be proved that the resolution is given by Eq. 30 but substituting f with d. Thus the resolution can be improved again by selection of a shorter wavelength, when the size of the CCD 128 is increased or the distance d is decreased. The Fresnel approximation is Eq. 31 restricts the possible values of d. There is also another limit imposed by the spatial quantization of the quadratic phase factor in Eq. 32. In this way the distance d must be kept greater than $\Delta x'^2/\lambda N$ to obtain a proper sampling of the phase factor.

The optical system 100 in FIG. 14 was experimentally constructed in to verify the performance of our approach. An argon laser 142 was used emitting a vertical polarized light beam with $\lambda=514.5$ nm. The retarder plates 108, 110 were half and quarter-wave plates optimized for the preceding wavelength. They were previously calibrated to find the directions of the fast and the slow axes. The four-step phase shifting was performed manually. However, other phase-shifting methods can be used to optically encrypt data in real time. For example, it is common to shift the mirror 120 of the reference beam 102*a* with a piezoelectric translator to obtain high-speed phase shifting.

The Fourier transform lens 140 in the object beam 102*b* had an approximate focal length f=200 mm and an approximate numerical aperture of 0.1. The input object 132, with the input phase mask 132*a* bonded, was located at a distanced from the Fourier transform lens 140. The input information 132 was encoded as a binary image in a black-and-white transparency. The reference phase mask 112 was located at an approximate distance z=300 mm from the CCD plane 130. The phase mask 112 is commercially available plastic diffuser of randomly varying thickness with a correlation length of 6 mm in both the x and y directions. The different interferograms were registered by a CCD camera 128, sampled with 480×480 pixels and quantized to 8 bits of gray level with a frame grabber. The size of the pixels in the camera 128 were measured to be $\Delta x' \Delta y'=10$ μm×10 μm.

FIG. 17 shows a computer-reconstructed image of the input to be encrypted. It was obtained by phase-shifting interferometry without use of the reference phase mask. Once the phase and the amplitude at the CCD plane 130 were obtained, an inverse FFT algorithm was applied to recover the input image. The noise in the image is due to the limited space-bandwidth of the optical system 100. The encrypted phase and amplitude distributions after location of the reference phase mask 112 as indicated in FIG. 14 are shown in FIGS. 18A and 18B, respectively, as gray-level pictures. By inverse Fourier transformation of the complex amplitude distribution associated with these images, the picture in FIG. 18C is obtained. We are able to obtain only a random-like intensity pattern.

Figure 19:
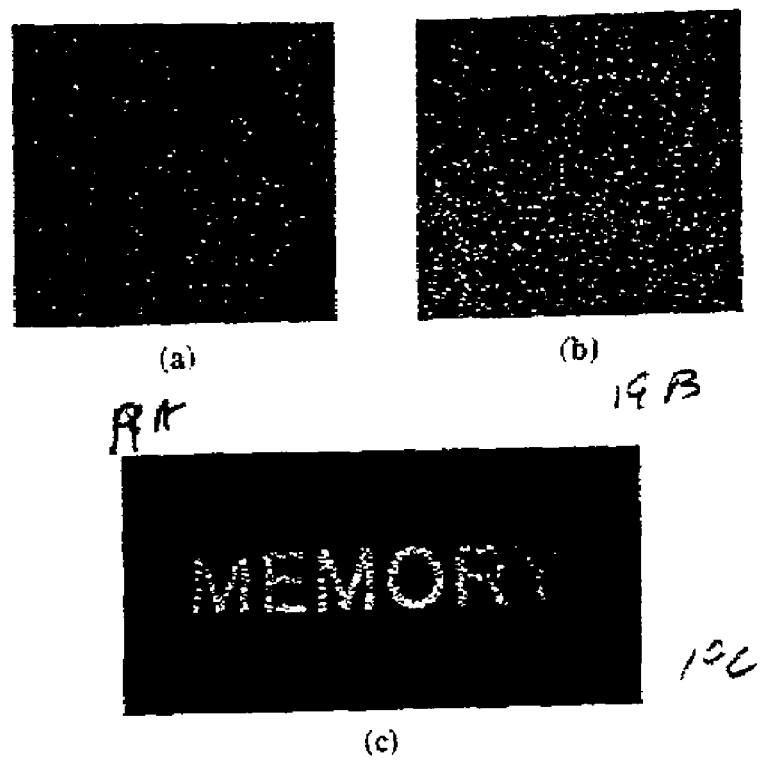

To decrypt the previous information the key phase and amplitude functions are measured by using Eqs. 25 and 26. These distributions are shown in FIGS. 19A and 19B as gray-level pictures. By correcting the images in FIGS. 18A and 18B with the key, as is stated in Eqs. 27 and 28, we are able to reconstruct the original image by inverse Fourier transform in a computer 402. The decrypted image is shown in FIG. 19C. The experimental results prove the feasibility of the proposed technique.

Figure 20:
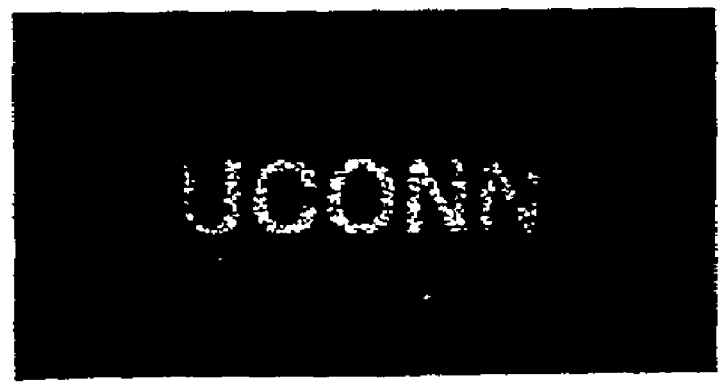
FIG. 20 is a representation of information to be encrypted by Fresnel propagation of the input signal obtained by digital phase-shifting interferometry with the optical system of FIG. 16 without the reference phase mask.
Figure 21:
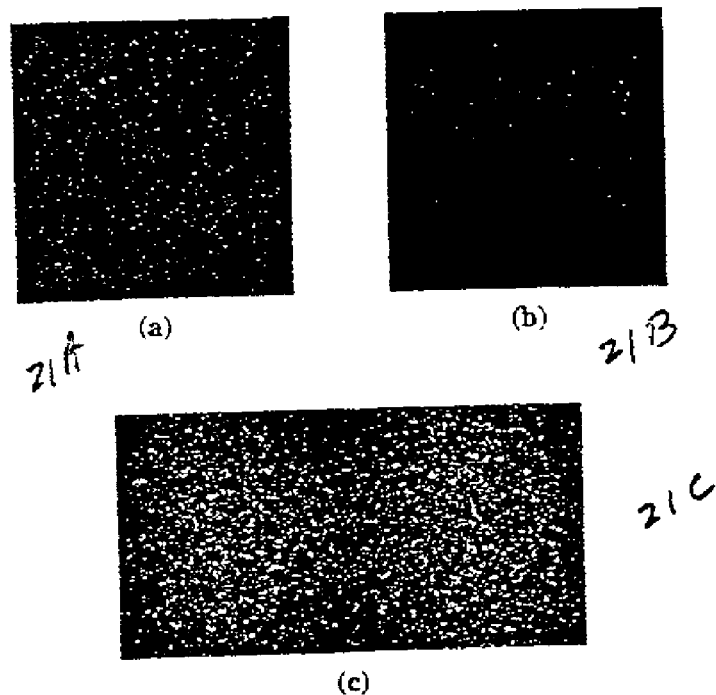
Figure 22:
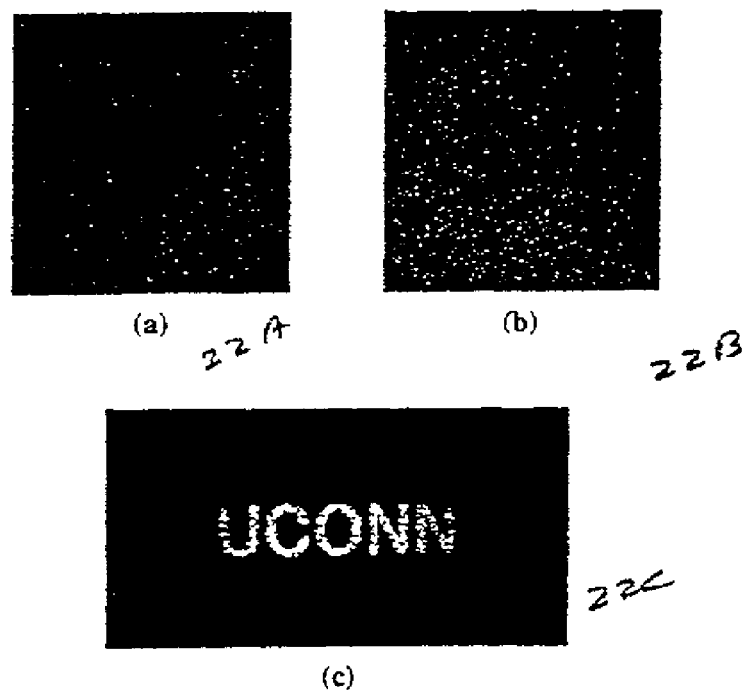

FIGS. 20-22C show the results obtained in the encryption experiment with free-space propagation of the amplitude distribution at the input plane 132, as shown in FIG. 16. In FIG. 20 we represent the input image obtained by phase-shifting interferometry without the reference phase mask 112. FIGS. 21A and 21B show the encrypted phase and amplitude functions, whereas FIG. 21C corresponds to the intensity distribution obtained from these functions by inverse Fresnel propagation in the computer. The key phase and amplitude functions are shown in FIGS. 22A and 22B.

Finally, FIG. 22C shows the decrypted image. Note that the quality of the image is almost the same as that in FIG. 20.

By the foregoing disclosure, a technique has been introduced to combine the high speed and the high security of optical encryption with the advantages of electronic transmission, processing, storage and decryption. Digital phase-shifting interferometry is exploited to use the limited CCD resolution more efficiently than can be done with off-axis digital holography. A three dimensional phase key in the Fresnel domain is used to provide high security. It has been described how this technique can be adapted to encrypt either the Fraunhofer or the Fresnel diffraction pattern of the input signal. Although Fresnel encryption requires a small increment of computation in the decryption process, the compactness, easy configuration of the optical system, and security improvement justify this second approach. Electronic decryption can be performed with a one-step FFT reconstruction procedure.

The proposed system can potentially encrypt and decrypt data at video frame rates. As an initial demonstration of the concept, for the experiments reported herein the four-step method of digital phase-shifting interferometry is implemented manually. However, other phase-shifting methods can be used to optically encrypt data in real time. Also, an opto-acoustic device can be used to perform high-speed phase shifting, and a digital signal processing chip can be used to perform high-speed electronic reconstruction.

In addition to allowing for electronic transmission of the encrypted information, the proposed system provides many degrees of freedom for securing information. It is also a convenient method for encrypting information in the optical domain such as real images and information stored in holographic media. Either optical or computer decryption techniques can be used with the proposed technique depending on the specific application.

Figure 12:
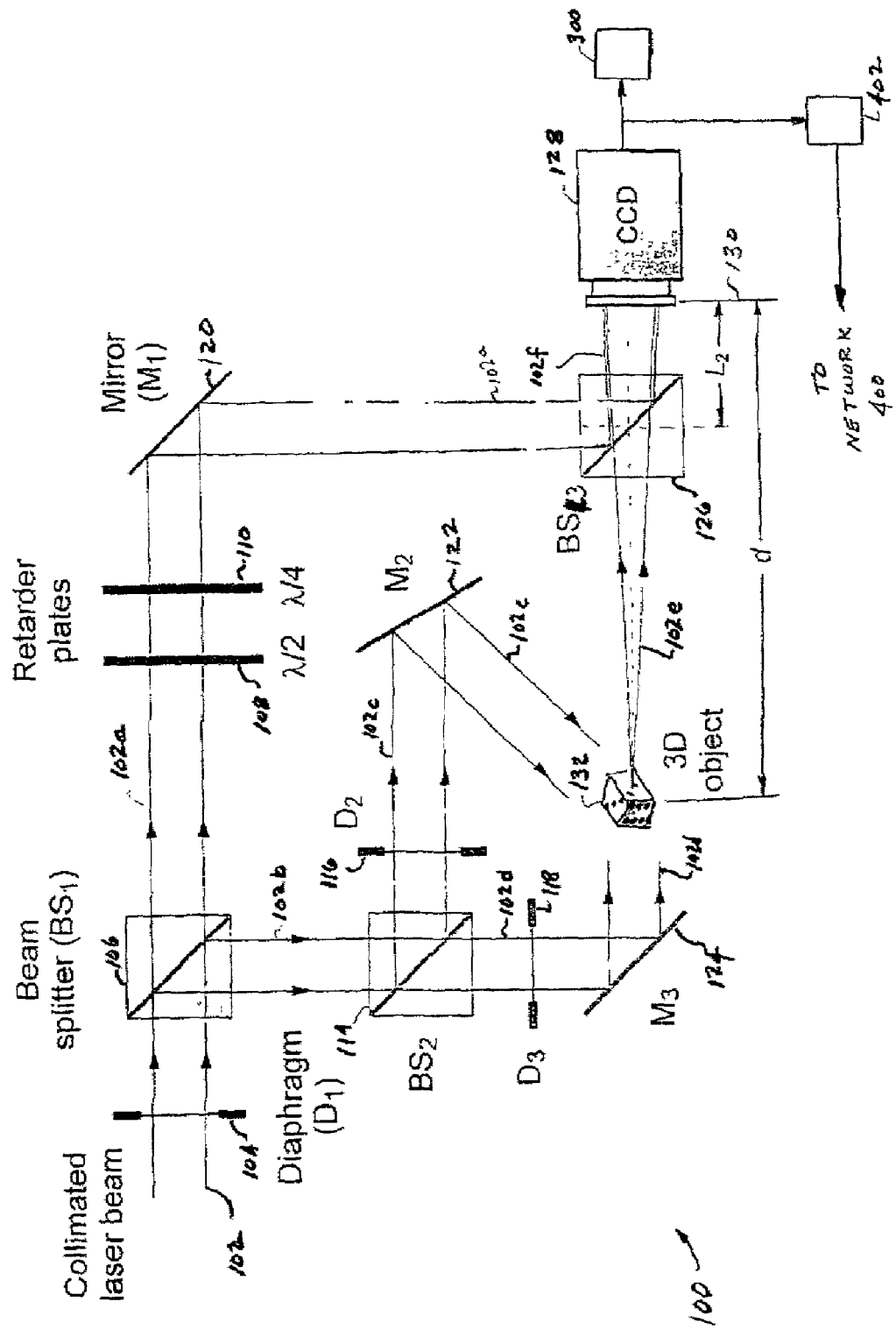
FIG. 12 is a schematic diagram of a phase-shifting holographic system for recording and reconstructing a multidimensional object.

In FIG. 12, an unencrypted hologram of the object 132, e.g., one formed without the use of random phase masks 112, 112*a*, may be formed at the output plane 130. Thus, in accordance with a third embodiment of the invention, a three dimensional optical display apparatus and method, based upon digital phase-shifting interferometry, may be used to record the fully complex information of a multi-dimensional object 132. Fourier and Fresnel domain optical recording is achieved by interfering the input object beam 102*e* and the reference beam 102*a* in an interferometer, such as a Mach-Zehnder phase-shifting interferometer 100. The recorded information can be transmitted over a distributed computer or communications network 400 via digital communication lines as in FIG. 9. However, the computers 402, 404, 504, display devices 412, 412*a* and other devices of the networks 400, 500, 504 in FIG. 9 are configured to execute program software, that allows them to send, receive, record, store and process compressed and decompressed holograms or sets of data between and amongst themselves via the networks 400, 504 and the Internet 500. Such processing includes, for example, various image compression and decompression methods applied to the recorded interferometric information of the three dimensional object 132 before electronic transmission or storage thereof. Similar methods can be applied to decompressed information before reconstruction of the three dimensional object 132. The processing also includes filtering, contrast enhancement, image sharpening, noise removal and correlation for image classification. Decompressed images may be displayed on display devices such as liquid crystal displays, liquid crystal TVs, or electrically or optically addressable spatial light modulators for applications in three dimensional TV and three dimensional display.

This embodiment has applications in the serial three dimensional imaging of moving objects, such as in three dimensional TV, three dimensional video, three dimensional movies as well as three dimensional display and three dimensional visualization and other similar applications. Thus serial images may be formed of moving objects by forming a series of original holograms of the moving objects; compressing the series of original holograms of the moving objects to form a series of compressed holograms; decompressing the series of compressed holograms to form a series of decompressed holograms; and reconstructing the moving objects from the series of decompressed holograms to form a series of multi-dimensional images of the moving objects.

The reconstruction is performed immediately and directly upon the fully complex information and, if performed electronically, requires no more computation than the usual image reconstruction procedures. After decompression, electronic reconstruction with a one-step fast Fourier transform (FFT) procedure or optical reconstruction methods can be applied. The three dimensional or multi-dimensional reconstruction of the object 132 can be performed either electronically, optically or optoelectronically as in FIGS. 13A and 13B respectively.

Thus, a digital hologram of the object 132 may be formed in the output plane 130 and then compressed by signal compression methods. The compressed digital hologram may then be transmitted to remote locations over digital communications lines whereat the digital hologram is decompressed. The object 132 is then reconstructed from the decompressed digital hologram.

It will be recognized that the holograms formed at the output plane 130 are not limited to the in-line holograms of FIGS. 1, 10, 11 and 12, but may also be formed by off-axis holograms as is well known in the art.

The following are incorporated herein by reference: B. Javidi and E. Tajahuerce, "*Three Dimensional Image Processing And Reconstruction*" International Symposium On Photonics For Aerospace Application Of Optics, SPIE Proceedings Vol. 4043, Orlando Fla., Apr. 24–28, 2000; U.S. patent application Ser. No. 09/493/692, entitled "Optical Security System Using Fourier Plane Encoding" and filed Jan. 28, 2000.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting the claims.

What is claimed is:

1. A method of encrypting a set of data, the method comprising:
   generating an original set of data regarding a 3D input scene with multiple perspectives;
   generating a reference set of data;
   encoding the reference set of data; and
   combining the original set of data with the encoded reference set of data to generate an encrypted set of data;
   wherein the encoding of the reference set of data comprises phase encoding the reference set of data;
   wherein the phase encoding of the reference set of data comprises introducing a random phase into the reference set of data; and
   further comprising recording the encrypted set of data in a digital hologram;
   wherein the recording of the encrypted set of data in a hologram comprises recording the encrypted set of data in a hologram according to the equation:

$$I_P(x,y)=[A_H(x,y)]^2+[A_R(x,y)]^2+2A_H(x,y)A_R(x,y)\cos[\phi_H(x,y)-\phi_R(x,y)-\Delta\phi_P];$$

and
   wherein said $\phi_E(x,y)$ is expressed as $$\phi_E(x,y) = \arctan\left(\frac{I_4 - I_2}{I_1 - I_3}\right)$$

is the encrypted phase and said $A_E(x,y)$ is expressed as $$A_E(x,y) = \frac{1}{4}[(I_1 - I_3)^2 + (I_4 - I_2)^2]^{1/2}$$

is the encrypted amplitude.

2. The method as set forth in claim 1 wherein the introducing of a random phase into the reference set of data comprises introducing a random phase into the reference set of data according to the equation:

$$U_R(x,y;\Delta\phi_P)=A_R(x,y)\exp[i(\phi_R(x,y)+\Delta\phi_P)]$$

wherein $\phi_R(x,y)$ is a random function, $\Delta\phi_P$ is a phase shift between the original set of data and the reference set of data and $A_R(x,y)$ is the amplitude of the phase encoded reference set of data.

3. The method as set forth in claim 1 wherein the encoding of the reference set of data comprises amplitude encoding the reference set of data.

4. The method as set forth in claim 3 wherein the amplitude encoding of the reference set of data comprises introducing a random amplitude into the reference set of data.

5. The method as set forth in claim 4 wherein the introducing of a random amplitude into the reference set of data comprises introducing a random amplitude into the reference set of data according to the equation:

$$U_R(x,y;\Delta\phi_P)=A_R(x,y)\exp[i(\phi_R(x,y)+\Delta\phi_P)]$$

wherein $A_R(x,y)$ is a random function, $\Delta\phi_P$ is a phase shift between the reference set of data and the original set of data and $\phi_R(x,y)$ is the phase of the phase encoded reference set of data.

6. The method as set forth in claim 1 further comprising introducing a phase shift between the original set of data and the reference set of data.

7. The method as set forth in claim 1 wherein the original set of data comprises an optical image, a digitized image, a one dimensional set of data, a two dimensional set of data, a multi-dimensional set of data, an electrical signal or an optical signal.

8. The method as set forth in claim 1 wherein the reference set of data comprises an optical image, a digitized image, a one dimensional set of data, a two dimensional set of data, a multi-dimensional set of data, an electrical signal or an optical signal.

9. The method as set forth in claim 1 further comprising:
   processing the encrypted set of data by compression of the hologram; and conveying the compressed hologram to remote locations over a distributed computer network.

10. A method of encrypting and decrypting a set of data, the method comprising:
generating an original set of data regarding a 3D input scene with multiple perspectives;
generating a reference set of data;
encoding the reference set of data;
combining the original set of data with the encoded reference set of data to generate an encrypted set of data; and
decrypting the encrypted set of data;
wherein the encoding of the reference set of data comprises phase encoding the reference set of data; and
wherein the phase encoding of the reference set of data comprises introducing a random phase into the reference set of data;
further comprising recording the encrypted set of data in a hologram;
wherein the decrypting of the encrypted set of data comprises generating a set of decryption keys by generating a set of intensity patterns, $I'_p$, of the combination of the reference beam and a phase shifted reference beam.

11. The method as set forth in claim 10 wherein the introducing of a random phase into the reference set of data comprises introducing a random phase into the reference set of data according to the equation:

$$U_R(x,y;\Delta\phi_p)=A_R(x,y)\exp[i(\phi_R(x,y)+\Delta\phi_p)]$$

wherein $\phi_R(x,y)$ is a random function, $\Delta\phi_p$ is a phase shift between the original set of data and the reference set of data and $A_R(x,y)$ is the amplitude of the phase encoded reference set of data.

12. The method as set forth in claim 10 wherein the encoding of the reference set of data comprises amplitude encoding the reference set of data.

13. The method as set forth in claim 12 wherein the amplitude encoding of the reference set of data comprises introducing a random amplitude into the reference set of data.

14. The method as set forth in claim 13 wherein the introducing of a random amplitude into the reference set of data comprises introducing a random amplitude into the reference set of data according to the equation:

$$U_R(x,y;\Delta\phi_p)=A_R(x,y)\exp[i(\phi_R(x,y)+\Delta\phi_p)]$$

wherein $A_R(x,y)$ is a random function, $\Delta\phi_p$ is a phase shift between the reference set of data and the original set of data and $\phi_R(x,y)$ is the phase of the phase encoded reference set of data.

15. The method as set forth in claim 10 further comprising introducing a phase shift between the original set of data and the reference set of data.

16. The method as set forth in claim 10 wherein the recording of the encrypted set of data in a hologram comprises recording the encrypted set of data in a hologram according to the equation:

$$I_p(x,y)=[A_H(x,y)]^2+[A_R(x,y)]^2+2A_H(x,y)A_R(x,y)\cos[\phi_H(x,y)-\phi_R(x,y)-\Delta\phi_p]$$

wherein, p is an integer, $$\phi E(x,y)=\phi_H(x,y)-\phi_R(x,y)$$

is the encrypted phase and $$A_E(x,y)=A_H(x,y)A_R(x,y)$$

is the encrypted amplitude, $\Delta\phi_p$ is a phase shift between the reference set of data and the original set of data, $[A^H(x,y)]^2$ is the intensity of the original set of data and $[A_R(x,y)]^2$ is the intensity of the encoded reference set of data.

17. The method as set forth in claim 16 wherein said $\phi_E(x,y)$ is expressed as $$\phi_E(x,y)=\arctan\left(\frac{I_4-I_2}{I_1-I_3}\right)$$

is the encrypted phase and said $A_E(x,y)$ is expressed as $$A_E(x,y)=\frac{1}{4}[(I_1-I_3)^2+(I_4-I_2)^2]^{\frac{1}{2}}$$

is the encrypted amplitude.

18. The method as set forth in claim 10 wherein the original set of data comprises an optical image, a digitized image, a one dimensional set of data, a two dimensional set of data, a multi-dimensional set of data, an electrical signal or an optical signal.

19. The method as set forth in claim 10 wherein the reference set of data comprises an optical image, a digitized image, a one dimensional set of data, a two dimensional set of data, a multi-dimensional set of data, an electrical signal or an optical signal.

20. The method as set forth in claim 10 wherein the generation of a set of decryption keys includes generating a phase key.

21. The method as set forth in claim 20 wherein the generation of a phase key includes generating a phase key according to the equation $$\phi_K(x,y)=\phi_C-\phi_R(x,y)$$

wherein $\phi_C$ is a constant $\phi_R(x,y)$ is a random function.

22. The method as set forth in claim 21 further comprising generating a decrypted phase.

23. The method as set forth in claim 22 wherein the generating of a decrypted phase comprises generating a decrypted phase according to the equation $$\phi_D(x,y)=\phi_E(x,y)-\phi_K(x,y)$$

wherein $\phi_E(x,y)$ is the encrypted phase and $\phi_K(x,y)$ is the phase key.

24. The method as set forth in claim 22 wherein the generating of a decrypted phase comprises generating a decrypted phase according to the equation $$\phi_D(x,y)=\arctan\left[\frac{(I_4-I_2)(I'_1-I'_3)-(I_1-I_3)(I'_4-I'_2)}{(I_4-I_2)(I'_4-I'_2)-(I_1-I_3)(I'_1-I'_3)}\right]$$

wherein $I_p$ are the encrypted set of data and $I'_p$ are the decrypted set of data and p is an integer.

25. The method as set forth in claim 22 further comprising generating a decrypted hologram according to the equation $$U_D(x,y)=A_D(x,y)\exp[i\phi_D(x,y)]$$

wherein $\phi_D(x,y)$ is the phase of the decrypted hologram.

26. The method as set forth in claim 25 further comprising reconstructing the original set of data from the decrypted hologram.

27. The method as set forth on claim 21 wherein said $\phi_K(x,y)$ is expressed as $$\phi_K(x, y) = \arctan\left(\frac{I'_4 - I'_2}{I'_1 - I'_3}\right),$$

$I'_p$ are the decrypted set of data and p is an integer.

28. The method as set forth in claim 10 wherein the generation of a set of decryption keys includes generating an amplitude key.

29. The method as set forth in claim 28 wherein the generation of an amplitude key includes generating an amplitude key according to the equation $$A_K(x,y) = A_C A_R(x,y)$$

wherein $A_C$ is a constant $A_R(x,y)$ is a random function.

30. The method as set forth in claim 29 further comprising generating a decrypted amplitude.

31. The method as set forth in claim 30 further comprising generating a decrypted hologram according to the equation $$U_D(x,y) = A_D(x,y)\exp[i\phi_D(x,y)]$$

wherein $A_D(x,y)$ is the amplitude of the decrypted hologram.

32. The method as set forth in claim 31 further comprising reconstructing the original set of data from the decrypted hologram.

33. The method as set forth in claim 30 wherein the generating of a decrypted amplitude comprises generating a decrypted amplitude according to the equation $$A_D(x, y) = \begin{cases} \frac{A_E(x, y)}{A_K(x, y)}, & \text{if } A_K(x, y) \neq 0 \\ 0 & \text{otherwise} \end{cases}$$

wherein $A_E(x,y)$ is the encrypted amplitude and $A_K(x,y)$ is the amplitude key.

34. The method as set forth in claim 30 wherein the generating of a decrypted amplitude comprises generating a decrypted amplitude according to the equation $$A_D(x, y) = \left[\frac{(I_1 - I_3)^2 + (I_4 - I_2)^2}{(I'_1 - I'_3)^2 + (I'_4 - I'_2)^2}\right]^{1/2}$$

wherein $I_p$ are the encrypted set of data and $I'_p$ are the decrypted set of data and p is an integer.

35. The method as set forth in claim 29 wherein said $A_K(x,y)$ is expressed as $$A_K(x, y) = \frac{1}{4}[(I'_1 - I'_3)^2 + (I'_4 - I'_2)^2]^{1/2},$$

$I'_p$ are the decrypted set of data and p is an integer.

36. The method as set forth in claim 10 wherein the recording of the encrypted set of data in a hologram comprises recording the encrypted set of data in a digital hologram.

37. The method as set forth in claim 36 further comprising reconstructing the original set of data from the decrypted digital hologram.

38. The method as set forth in claim 37 wherein the reconstructing of the original set of data from the decrypted digital hologram comprises generating the discrete complex amplitude distribution of the reconstructed original set of data from the equation $$U_o(m', n') = \exp\left[\frac{-i\pi}{\lambda d}(\Delta x'^2 m'^2 + \Delta y'^2 n'^2)\right]$$

$$\sum_{m'=0}^{N_x-1} \sum_{n'=0}^{N_y-1} U_D(m, n) \times$$

$$\exp\left[\frac{-i\pi}{\lambda d}(\Delta x^2 m^2 + \Delta y^2 n^2)\right]$$

$$\exp\left[-i2\pi\left(\frac{m'm}{N_x} + \frac{n'n}{N_y}\right)\right]$$

wherein $U_D(m,n)$ is the discrete amplitude distribution of the decrypted digital hologram, m and n are coordinates in the plane of the hologram, m' and n' are coordinates in the reconstruction plane, $\Delta x$ is the horizontal resolution in the hologram plane, $\Delta y$ is the vertical resolution in the hologram plane, $\Delta x'$ is the horizontal resolution in the reconstruction plane, $\Delta y'$ is vertical resolution in the reconstruction plane, $N_x$ is the number of detector pixels in the x direction and $N_y$ is the number of detector pixels in the y direction.

39. The method as set forth in claim 37 wherein reconstructing the original set of data from the decrypted digital hologram comprises reconstructing the original set of data by digital image processing.

40. The method as set forth in claim 37 wherein reconstructing the original set of data from the decrypted digital hologram comprises reconstructing the original set of data by optical image processing.

41. The method as set forth in claim 36 further comprising reconstructing a segment of the original set of data from the decrypted digital hologram.

42. The method as set forth in claim 41 wherein the reconstructing of a segment of the original set of data from the decrypted digital hologram comprises defining a subset, $$rect\left(\frac{m - a_x}{b_x}, \frac{n - a_y}{b_y}\right),$$

of the decrypted digital hologram wherein $a_x$ is x coordinate of the center of the segment of the original set of data, $a_y$ is the y coordinate of the center of the segment of the original set of data $b_x$ is the width of the segment of the original set of data in the x direction, $b_y$ is the width of the segment of the original set of data in the y direction and m and n are coordinates in the plane of the hologram.

43. The method as set forth in claim 42 further comprising defining a partial discrete amplitude distribution over the subset of the decrypted digital hologram according to the equation $$U'_D(m, n; a_x, a_y) = U_D(m, n) rect\left(\frac{m - a_x}{b_x}, \frac{n - a_y}{b_y}\right)$$

wherein $U_D(m,n)$ is the discrete amplitude distribution of the decrypted digital hologram.

44. The method as set forth in claim 43 further comprising applying a phase factor, $\exp[i2\pi(a_x m+a_y n)]$, to the partial discrete amplitude distribution according to the equation $$U'_D(m, n; a_x, a_y) = U_D(m, n) \text{rect}\left(\frac{m-a_x}{b_x}, \frac{n-a_y}{b_y}\right) \exp[i2\pi(a_x m + a_y n)].$$

45. The method as set forth in claim 44 further comprising generating the discrete complex amplitude distribution of the segment of the original set of data from the decrypted digital hologram according to the equation $$U'_O(m', n'; \alpha, \beta) = \exp\left[\frac{-i\pi}{\lambda d}(\Delta x'^2 m'^2 + \Delta y'^2 n'^2)\right]$$
$$\sum_{m'=0}^{N_x-1} \sum_{n'=0}^{N_y-1} U'_D\left(m, n; \frac{\alpha d}{\Delta x}, \frac{\beta d}{\Delta y}\right) \times \exp\left[\frac{-i\pi}{\lambda d}(\Delta x^2 m^2 + \Delta y^2 n^2)\right]$$
$$\exp\left[-i2\pi\left(\frac{m'm}{N_x} + \frac{n'n}{N_y}\right)\right].$$

46. The method as set forth in claim 10 further comprising recording the set of decryption keys.

47. The method as set forth in claim 46 wherein the recording of the set of decryption keys includes digitally recording the set of decryption keys.

48. The method as set forth in claim 47 wherein the digitally recording of the set of decryption keys comprises storing the set of decryption keys in a computer-readable storage medium.

49. The method as set forth in claim 10 wherein the recording of the encrypted set of data comprises storing the encrypted set of data in a computer-readable storage medium.

50. The method as set forth in claim 49 further comprising transmitting the encrypted set of data to remote locations over a distributed computer network.

51. The method as set forth in claim 10 further comprising:
   processing the encrypted set of data by compression of the hologram; and
   conveying the compressed hologram to remote locations over a distributed computer network.

52. A storage medium encoded with a set of data created by:
   generating an original set of data regarding a 3D input scene with multiple perspectives;
   generating a reference set of data;
   encoding the reference set of data;
   combining the original set of data with the encoded reference set of data to generate an encrypted set of data; and
   storing the encrypted set of data;
   wherein the encoding of the reference set of data comprises phase encoding the reference set of data; and
   wherein the phase encoding of the reference set of data comprises introducing a random phase into the reference set of data; and
   further comprising recording the encrypted set of data in a hologram;

wherein the recording of the encrypted set of data in a hologram comprises recording the encrypted set of data in a hologram according to the equation:

$$I_p(x,y)=[A_H(x,y)]^2+[A_R(x,y)]^2+2A_H(x,y)A_R(x,y)\cos[\phi_H(x,y)-\phi_R(x,y)-\Delta\phi_p];$$

and
wherein said $\phi_E(x,y)$ is expressed as $$\phi_K(x, y) = \arctan\left(\frac{I'_4 - I'_2}{I'_1 - I'_3}\right),$$

is the encrypted phase and said $A_E(x,y)$ is expressed as $$A_E(x, y) = \frac{1}{4}[(I_1 - I_3)^2 + (I_4 - I_2)^2]^{1/2}$$

is the encrypted amplitude.

53. The storage medium as set forth in claim 52 wherein the introducing of a random phase into the reference set of data comprises introducing a random phase into the reference set of data according to the equation:

$$U_R(x,y;\Delta\phi_p)=A_R(x,y)\exp[i(\phi_R(x,y)+\Delta\phi_p)]$$

wherein $\phi_R(x,y)$ is a random function, $\Delta\phi_p$ is a phase shift between the original set of data and the reference set of data and $A_R(x,y)$ is the amplitude of the phase encoded reference set of data.

54. The storage medium as set forth in claim 52 wherein the encoding of the reference set of data comprises amplitude encoding the reference set of data.

55. The storage medium as set forth in claim 54 wherein the amplitude encoding of the reference set of data comprises introducing a random amplitude into the reference set of data.

56. The storage medium as set forth in claim 55 wherein the introducing of a random amplitude into the reference set of data comprises introducing a random amplitude into the reference set of data according to the equation:

$$U_R(x,y;\Delta\phi_p)=A_R(x,y)\exp[i(\phi_R(x,y)+\Delta\phi_p)]$$

wherein $A_R(x,y)$ is a random function, $\Delta\phi_p$ is a phase shift between the reference set of data and the original set of data and $\phi_R(x,y)$ is the phase of the phase encoded reference set of data.

57. The storage medium as set forth in claim 52 further comprising introducing a phase shift between the original set of data and the reference set of data.

58. The storage medium as set forth in claim 52 wherein the recording of the encrypted set of data in a hologram comprises recording the encrypted set of data in a hologram according to the equation:

$$I_p(x,y)=[A_H(x,y)]^2+[A_R(x,y)]^2+2A_H(x,y)A_R(x,y)\cos[\phi_H(x,y)-\phi_R(x,y)-\Delta\phi_p]$$

wherein p is an integer, $$\phi_E(x,y)=\phi_H(x,y)-\phi_R(x,y)$$

is the encrypted phase, $$A_E(x,y)=A_H(x,y)A_R(x,y)$$

is the encrypted amplitude, $\Delta\phi_p$ is a phase shift between the reference set of data and the original set of data, $[A_H(x,y)]^2$ is the intensity of the original set of data and $[A_R(x,y)]^2$ is the intensity of the encoded reference set of data.

59. The storage medium as set forth in claim 52 wherein the original set of data comprises an optical image, a digitized image, a one dimensional set of data, a two dimensional set of data, a multi-dimensional set of data, an electrical signal or an optical signal.

60. The storage medium as set forth in claim 52 wherein the reference set of data comprises an optical image, a digitized image, a one dimensional set of data, a two dimensional set of data, a multi-dimensional set of data, an electrical signal or an optical signal.

61. A method of encrypting a set of data, the method comprising:
   generating an original set of data regarding a 3D input scene with multiple perspectives;
   generating a reference set of data;
   encoding the original set of data; and
   combining the encoded original set of data with the reference set of data to generate an encrypted set of data;
   wherein the encoding of the original set of data comprises phase encoding the original set of data; and
   wherein the phase encoding of the original set of data comprises introducing a random phase into the original set of data;
   further comprising recording the encrypted set of data in a hologram;
   wherein the recording of the encrypted set of data in a hologram comprises recording the encrypted set of data in a hologram according to the equation:

$$I_p(x,y)=[A_H(x,y)]^2+[A_R(x,y)]^2+2A_H(x,y)A_R(x,y)\cos[\phi_H(x,y)-\phi_R(x,y)-\Delta\phi_p];$$

and
   wherein said $\phi_E(x,y)$ is expressed as $$\phi_E(x,y) = \arctan\left(\frac{I_4 - I_2}{I_1 - I_3}\right)$$

is the encrypted phase and said $A_E(x,y)$ is expressed as $$A_E(x,y) = \frac{1}{4}[(I_1 - I_3)^2 + (I_4 - I_2)^2]^{1/2}$$

is the encrypted amplitude.

62. The method as set forth in claim 61 wherein the introducing of a random phase into the original set of data comprises introducing a random phase into the original set of data according to the equation:

$$U_R(x,y;\Delta\phi_p)=A_R(x,y)\exp[i(\phi_R(x,y)+\Delta\phi_p)]$$

wherein $\phi_R(x,y)$ is a random function, $\Delta\phi_p$ is a phase shift between the original set of data and the reference set of data and $A_R(x,y)$ is the amplitude of the phase encoded original set of data.

63. The method as set forth in claim 61 wherein the encoding of the original set of data comprises amplitude encoding the original set of data.

64. The method as set forth in claim 63 wherein the amplitude encoding of the original set of data comprises introducing a random amplitude into the original set of data.

65. The method as set forth in claim 64 wherein the introducing of a random amplitude into the original set of data comprises introducing a random amplitude into the original set of data according to the equation:

$$U_R(x,y;\Delta\phi_p)=A_R(x,y)\exp[i(\phi_R(x,y)+\Delta\phi_p)]$$

wherein $A_R(x,y)$ is a random function, $\Delta\phi_p$ is a phase shift between the reference set of data and the original set of data and $\phi_R(x,y)$ is the phase of the phase encoded original set of data.

66. The method as set forth in claim 61 further comprising introducing a phase shift between the original set of data and the reference set of data.

67. The method as set forth in claim 61 wherein the recording of the encrypted set of data in a hologram comprises recording the encrypted set of data in a hologram according to the equation:

$$I_p(x,y)=[A_H(x,y)]^2+[A_R(x,y)]^2+2A_H(x,y)A_R(x,y)\cos[\phi_H(x,y)-\phi_R(x,y)-\Delta\phi_p]$$

wherein p is an integer, $$\phi_E(x,y)=\phi_H(x,y)-\phi_R(x,y)$$

is the encrypted phase, $$A_E(x,y)=A_H(x,y)A_R(x,y)$$

is the encrypted amplitude, $\Delta\phi_p$ is a phase shift between the reference set of data and the original set of data, $[A^H(x,y)]^2$ is the intensity of the original set of data and $[A_R(x,y)]^2$ is the intensity of the encoded reference set of data.

68. The method as set forth in claim 61 wherein the original set of data comprises an optical image, a digitized image, a one dimensional set of data, a two dimensional set of data, a multi-dimensional set of data, an electrical signal or an optical signal.

69. The method as set forth in claim 61 wherein the reference set of data comprises an optical image, a digitized image, a one dimensional set of data, a two dimensional set of data, a multi-dimensional set of data, an electrical signal or an optical signal.

70. The method as set forth in claim 61 further comprising:
   processing the encrypted set of data by compression of the hologram; and
   conveying the compressed hologram to remote locations over a distributed computer network.

71. A method of encrypting and decrypting a set of data, the method comprising:
   generating an original set of data;
   generating a reference set of data;
   encoding the reference set of data;
   combining the original set of data with the encoded reference set of data to generate an encrypted set of data; and
   decrypting the encrypted set of data;
   wherein the decrypting of the encrypted set of data comprises generating a set of decryption keys by generating a set of intensity patterns, $I'_p$, of the combination of a reference beam and a phase shifted reference beam;
   wherein the generation of a set of decryption keys includes generating a phase key; and
   wherein the generation of a phase key includes generating a phase key according to the equation:

$$\phi_K(x,y)=\phi_C-\phi_R(x,y)$$

wherein $\phi_C$ is a constant $\phi_R(x,y)$ is a random function.

72. The method as set forth in claim 71 wherein said $\phi_K(x,y)$ is expressed as $$\phi_K(x, y) = \arctan\left(\frac{I'_4 - I'_2}{I'_1 - I'_3}\right),$$

$I'_p$ are the decrypted set of data and p is an integer.

73. The method as set forth in claim 71 further comprising generating a decrypted phase.

74. The method as set forth in claim 73 wherein the generating of a decrypted phase comprises generating a decrypted phase according to the equation:

$$\phi_D(x,y) = \phi_E(x,y) - \phi_K(x,y)$$

wherein $\phi_E(x,y)$ is the encrypted phase and $\phi_K(x,y)$ is the phase key.

75. The method as set forth in claim 73 wherein the generating of a decrypted phase comprises generating a decrypted phase according to the equation $$\phi_D(x, y) = \arctan\left[\frac{(I_4 - I_2)(I'_1 - I'_3) - (I_1 - I_3)(I'_4 - I'_2)}{(I_4 - I_2)(I'_4 - I'_2) - (I_1 - I_3)(I'_1 - I'_3)}\right]$$

wherein $I_p$ are the encrypted set of data and $I'_p$ are the decrypted set of data and p is an integer.

76. The method as set forth in claim 73 further comprising generating a decrypted hologram according to the equation $$U_D(x,y) = A_D(x,y)\exp[i\phi_D(x,y)]$$

wherein $\phi_D(x,y)$ is the phase of the decrypted hologram.

77. The method as set forth in claim 76 further comprising reconstructing the original set of data from the decrypted hologram.

78. A method of encrypting and decrypting a set of data, the method comprising:
  generating an original set of data;
  generating a reference set of data;
  encoding the reference set of data;
  combining the original set of data with the encoded reference set of data to generate an encrypted set of data; and
  decrypting the encrypted set of data;
  wherein the decrypting of the encrypted set of data comprises generating a set of decryption keys by generating a set of intensity patterns, $I'_p$, of the combination of a reference beam and a phase shifted reference beam;
  wherein the generation of a set of decryption keys includes generating an amplitude key; and
  wherein the generation of an amplitude key includes generating an amplitude key according to the equation:

$$A_K(x,y) = A_C A_R(x,y)$$

wherein $A_C$ is a constant $A_R(x,y)$ is a random function.

79. The method as set forth in claim 78 wherein said $A_K(x,y)$ is expressed as $$A_K(x, y) = \frac{1}{4}[(I'_1 - I'_3)^2 + (I'_4 - I'_2)^2]^{1/2}, \text{ where}$$

$I'_p$ are the decrypted set of data and p is an integer.

80. The method as set forth in claim 78 further comprising generating a decrypted amplitude.

81. The method as set forth in claim 80 wherein the generating of a decrypted amplitude comprises generating a decrypted amplitude according to the equation $$A_D(x, y) = \begin{cases} \dfrac{A_E(x, y)}{A_K(x, y)}, & \text{if } A_K(x, y) \neq 0 \\ 0 & \text{otherwise} \end{cases}$$

wherein $A_E(x,y)$ is the encrypted amplitude and $A_K(x,y)$ is the amplitude key.

82. The method as set forth in claim 80 wherein the generating of a decrypted amplitude comprises generating a decrypted amplitude according to the equation $$A_D(x, y) = \left[\frac{(I_1 - I_3)^2 + (I_4 - I_2)^2}{(I'_1 - I'_3)^2 + (I'_4 - I'_2)^2}\right]^{1/2}$$

wherein $I_p$ are the encrypted set of data and $I'_p$ are the decrypted set of data and p is an integer.

83. The method as set forth in claim 80 further comprising generating a decrypted hologram according to the equation:

$$U_D(x,y) = A_D(x,y)\exp[i\phi_D(x,y)]$$

wherein $A_D(x,y)$ is the amplitude of the decrypted hologram.

84. The method as set forth in claim 83 further comprising reconstructing the original set of data from the decrypted hologram.

85. A method of encrypting and decrypting a set of data, the method comprising:
  generating an original set of data;
  generating a reference set of data;
  encoding the reference set of data;
  combining the original set of data with the encoded reference set of data to generate an encrypted set of data; and
  decrypting the encrypted set of data;
  further comprising recording the encrypted set of data;
  wherein the recording of the encrypted set of data comprises recording the encrypted set of data in a hologram;
  wherein the recording of the encrypted set of data in a hologram comprises recording the encrypted set of data in a digital hologram;
  further comprising reconstructing a segment of the original set of data from the decrypted digital hologram;
  wherein the reconstructing of a segment of the original set of data from the decrypted digital hologram comprises defining a subset, $$rect\left(\frac{m - a_x}{b_x}, \frac{n - a_y}{b_y}\right),$$

the decrypted digital hologram wherein $a_x$ is x coordinate of the center of the segment of the original set of data, $a_y$ is the y coordinate of the center of the segment of the original set of data $b_x$ is the width of the segment of the original set of data in the x direction, $b_y$ is the width of the segment of the original set of data in the y direction and m and n are coordinates in the plane of the hologram.

86. The method as set forth in claim 85 further comprising defining a partial discrete amplitude distribution over the subset of the decrypted digital hologram according to the equation $$U'_D(m, n; a_x, a_y) = U_D(m, n) rect\left(\frac{m - a_x}{b_x}, \frac{n - a_y}{b_y}\right)$$

wherein $U_D(m,n)$ is the discrete amplitude distribution of the decrypted digital hologram.

87. The method as set forth in claim 85 further comprising applying a phase factor, $\exp[i2\pi(a_x m + a_y n)]$, to the partial discrete amplitude distribution according to the equation $$U'_D(m, n; a_x, a_y) = U_D(m, n) rect\left(\frac{m - a_x}{b_x}, \frac{n - a_y}{b_y}\right) \exp[i2\pi(a_x m + a_y n)].$$

88. The method as set forth in claim 87 further comprising generating the discrete complex amplitude distribution of the segment of the original set of data from the decrypted digital hologram according to the equation $$U'_o(m', n'; \alpha, \beta) =$$
$$\exp\left[\frac{-i\pi}{\lambda d}(\Delta x'^2 m'^2 + \Delta y'^2 n'^2)\right] \sum_{m'=0}^{N_x-1} \sum_{n'=0}^{N_y-1} U'_D\left(m, n; \frac{\alpha d}{\Delta x}, \frac{\beta d}{\Delta y}\right) \times$$
$$\exp\left[\frac{-i\pi}{\lambda d}(\Delta x^2 m^2 + \Delta y^2 n^2)\right] \exp\left[-i2\pi\left(\frac{m'm}{N_x} + \frac{n'n}{N_y}\right)\right].$$

89. A method of encrypting and decrypting a set of data, the method comprising:
generating an original set of data regarding a 3D input scene with multiple perspectives;
generating a reference set of data;
encoding the reference set of data;
combining the original set of data with the encoded reference set of data to generate an encrypted set of data; and
decrypting the encrypted set of data;
wherein the encoding of the reference set of data comprises phase encoding the reference set of data; and
wherein the phase encoding of the reference set of data comprises introducing a random phase into the reference set of data;
further comprising recording the encrypted set of data in a hologram;
wherein the recording of the encrypted set of data in a hologram comprises recording the encrypted set of data in a digital hologram;
further comprising reconstructing a segment of the original set of data from the decrypted digital hologram;
wherein the reconstructing of a segment of the original set of data from the decrypted digital hologram comprises defining a subset, $$rect\left(\frac{m - a_x}{b_x}, \frac{n - a_y}{b_y}\right),$$

of the decrypted digital hologram wherein $a_x$ is x coordinate of the center of the segment of the original set of data, $a_y$ is the y coordinate of the center of the segment of the original set of data $b_x$ is the width of the segment of the original set of data in the x direction, $b_y$ is the width of the segment of the original set of data in the y direction and m and n are coordinates in the plane of the hologram.

90. The method as set forth in claim 89 further comprising defining a partial discrete amplitude distribution over the subset of the decrypted digital hologram according to the equation $$U'_D(m, n; a_x, a_y) = U_D(m, n) rect\left(\frac{m - a_x}{b_x}, \frac{n - a_y}{b_y}\right)$$

wherein $U_D(m,n)$ is the discrete amplitude distribution of the decrypted digital hologram.

91. The method as set forth in claim 90 further comprising applying a phase factor, $\exp[i2\pi(a_x m + a_y n)]$, to the partial discrete amplitude distribution according to the equation $$U'_D(m, n; a_x, a_y) = U_D(m, n) rect\left(\frac{m - a_x}{b_x}, \frac{n - a_y}{b_y}\right) \exp[i2\pi(a_x m + a_y n)].$$

92. The method as set forth in claim 91 further comprising generating the discrete complex amplitude distribution of the segment of the original set of data from the decrypted digital hologram according to the equation $$U_o(m', n') = \exp\left[\frac{-i\pi}{\lambda d}(\Delta x'^2 m'^2 + \Delta y'^2 n'^2)\right]$$
$$\sum_{m'=0}^{N_x-1} \sum_{n'=0}^{N_y-1} U_D(m, n) \times$$
$$\exp\left[\frac{-i\pi}{\lambda d}(\Delta x^2 m^2 + \Delta y^2 n^2)\right]$$
$$\exp\left[-i2\pi\left(\frac{m'm}{N_x} + \frac{n'n}{N_y}\right)\right]$$

* * * * *